(12) United States Patent
Williams et al.

(10) Patent No.: US 8,882,143 B2
(45) Date of Patent: Nov. 11, 2014

(54) AIRBAG WITH SLIT VENT

(71) Applicant: Autoliv ASP, Inc., Ogden, UT (US)

(72) Inventors: Jeffrey D. Williams, Roy, UT (US); Kent Potter, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/762,679

(22) Filed: Feb. 8, 2013

(65) Prior Publication Data

US 2014/0225354 A1  Aug. 14, 2014

(51) Int. Cl.
  *B60R 21/239* (2006.01)
  *D05B 13/00* (2006.01)
  *D05B 1/26* (2006.01)

(52) U.S. Cl.
  CPC .............. *B60R 21/239* (2013.01); *D05B 13/00* (2013.01); *D05B 1/26* (2013.01)
  USPC ....................................... 280/739; 280/743.1

(58) Field of Classification Search
  CPC .................................................... B60R 21/239
  USPC ......................................................... 280/739
  See application file for complete search history.

(56) References Cited

U.S. PATENT DOCUMENTS

| | | | |
|---|---|---|---|
| 2,937,380 A | 5/1960 | Reese | |
| 4,169,613 A * | 10/1979 | Barnett | ........................ 280/732 |
| 4,181,325 A | 1/1980 | Barnett | |
| 5,016,913 A | 5/1991 | Nakajima et al. | |
| 5,172,933 A | 12/1992 | Strasser | |
| 5,240,283 A | 8/1993 | Kishi et al. | |
| 5,246,250 A | 9/1993 | Wolanin et al. | |
| 5,280,953 A | 1/1994 | Wolanin et al. | |
| 5,290,953 A | 3/1994 | Clark, Jr. et al. | |
| 5,306,043 A | 4/1994 | Mihm et al. | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,520,413 A | 5/1996 | Mossi et al. | |
| 5,603,526 A | 2/1997 | Buchanan | |
| 5,775,729 A | 7/1998 | Schneider et al. | |
| 5,839,755 A | 11/1998 | Turnbull | |
| 5,931,497 A | 8/1999 | Fischer | |

(Continued)

FOREIGN PATENT DOCUMENTS

AU   2005294731   8/2012
DE   196 40 322   3/1996

(Continued)

OTHER PUBLICATIONS

Office Action issued Jul. 9, 2010 in co-pending U.S. Appl. No. 12/397,251, now issued as U.S. Patent No. 7,938,445.

(Continued)

*Primary Examiner* — Ruth Ilan
(74) *Attorney, Agent, or Firm* — Stoel Rives LLP

(57) ABSTRACT

An airbag can include a panel that defines at least a portion of an inflatable chamber. The airbag can also include a slit vent that is at least partially defined by the panel. One or more seams can encompass the slit vent and can permit the slit vent to naturally be in a closed orientation.

32 Claims, 14 Drawing Sheets

(56) References Cited

U.S. PATENT DOCUMENTS

| | | |
|---|---|---|
| 5,945,184 A | 8/1999 | Nagata et al. |
| 6,017,057 A | 1/2000 | O'Docherty |
| 6,056,318 A | 5/2000 | Braunschadel |
| 6,095,557 A | 8/2000 | Takimoto et al. |
| 6,126,196 A | 10/2000 | Zimmerman |
| 6,139,048 A | 10/2000 | Braunschadel |
| 6,183,003 B1 | 2/2001 | Matsuhashi et al. |
| 6,206,408 B1 | 3/2001 | Schneider |
| 6,247,726 B1 | 6/2001 | Ryan |
| 6,290,257 B1 | 9/2001 | Bunce et al. |
| 6,371,509 B1 | 4/2002 | Ellerbrok et al. |
| 6,390,501 B1 | 5/2002 | Greib et al. |
| 6,398,258 B2 | 6/2002 | Hamada et al. |
| 6,419,267 B1 | 7/2002 | Hashimoto et al. |
| 6,554,313 B2 | 4/2003 | Uchida |
| 6,631,921 B1 | 10/2003 | Drossler et al. |
| 6,631,922 B2 | 10/2003 | Hess et al. |
| 6,648,371 B2 | 11/2003 | Vendely et al. |
| 6,722,695 B2 | 4/2004 | Kobayashi et al. |
| 6,746,045 B2 | 6/2004 | Short et al. |
| 6,773,027 B2 | 8/2004 | Bohn et al. |
| 6,773,030 B2 | 8/2004 | Fischer |
| 6,784,379 B2 | 8/2004 | Breed et al. |
| 6,786,505 B2 | 9/2004 | Yoshida |
| 6,832,778 B2 | 12/2004 | Pinsenschaum et al. |
| 6,863,304 B2 | 3/2005 | Reiter et al. |
| 6,918,613 B2 | 7/2005 | Short et al. |
| 6,932,385 B2 | 8/2005 | Hawthorn et al. |
| 6,962,363 B2 | 11/2005 | Wang |
| 6,971,664 B2 | 12/2005 | Amamori |
| 6,971,671 B2 | 12/2005 | Schneider et al. |
| 7,059,634 B2 | 6/2006 | Bossecker et al. |
| 7,066,487 B2 | 6/2006 | Sullivan |
| 7,083,191 B2 | 8/2006 | Fischer |
| 7,083,192 B2 | 8/2006 | Fischer et al. |
| 7,195,281 B2 | 3/2007 | Williams et al. |
| 7,210,702 B2 | 5/2007 | Soderquist |
| 7,237,802 B2 | 7/2007 | Rose et al. |
| 7,261,319 B2 | 8/2007 | DePottey et al. |
| 7,328,915 B2 | 2/2008 | Smith et al. |
| 7,347,450 B2 | 3/2008 | Williams et al. |
| 7,360,789 B2 | 4/2008 | Bito |
| 7,364,192 B2 | 4/2008 | Braun et al. |
| 7,377,548 B2 | 5/2008 | Bauer et al. |
| 7,413,218 B2 | 8/2008 | Ekdahl |
| 7,441,805 B2 | 10/2008 | Jamison |
| 7,556,290 B2 | 7/2009 | Williams et al. |
| 7,568,729 B2 | 8/2009 | Schneider et al. |
| 7,597,355 B2 | 10/2009 | Williams et al. |
| 7,597,356 B2 | 10/2009 | Williams |
| 7,600,782 B2 | 10/2009 | Ishiguro et al. |
| 7,604,252 B2 | 10/2009 | Heitplatz et al. |
| 7,607,689 B2 | 10/2009 | Kalczynski et al. |
| 7,607,690 B2 | 10/2009 | Abe et al. |
| 7,614,653 B2 | 11/2009 | Rose et al. |
| 7,614,654 B2 | 11/2009 | Williams |
| 7,651,130 B2 | 1/2010 | Bauberger |
| 7,654,561 B2 | 2/2010 | Webber et al. |
| 7,673,899 B2 | 3/2010 | Abe |
| 7,722,080 B2 | 5/2010 | Rose |
| 7,726,685 B2 | 6/2010 | Abe et al. |
| 7,748,738 B2 | 7/2010 | Schneider |
| 7,762,576 B2 | 7/2010 | Cho |
| 7,770,925 B2 | 8/2010 | Seymour et al. |
| 7,770,926 B2 | 8/2010 | Schneider |
| 7,784,828 B2 | 8/2010 | Mills et al. |
| 7,857,347 B2 | 12/2010 | Abe et al. |
| 7,878,538 B2 | 2/2011 | Abe et al. |
| 7,931,297 B2 | 4/2011 | Abe et al. |
| 7,938,444 B2 | 5/2011 | Williams et al. |
| 7,938,445 B2 | 5/2011 | Smith et al. |
| 7,946,613 B2 | 5/2011 | Rose et al. |
| 7,959,184 B2 | 6/2011 | Fukawatase et al. |
| 8,047,570 B2 | 11/2011 | Feller |
| 8,070,183 B2 | 12/2011 | Kumagai et al. |
| 8,191,925 B2 | 6/2012 | Williams |
| 8,226,118 B2 | 7/2012 | Rose et al. |
| 2002/0117840 A1 | 8/2002 | Dunkle et al. |
| 2003/0020266 A1 | 1/2003 | Vendely et al. |
| 2003/0020268 A1 | 1/2003 | Reiter et al. |
| 2003/0030254 A1 | 2/2003 | Hasebe |
| 2003/0057691 A1 | 3/2003 | Tokita et al. |
| 2003/0127839 A1 | 7/2003 | Jenkins |
| 2003/0201630 A1 | 10/2003 | Moon |
| 2003/0209895 A1 | 11/2003 | Gu |
| 2003/0214125 A1 | 11/2003 | Schneider et al. |
| 2003/0222446 A1 | 12/2003 | Soderquist et al. |
| 2004/0012179 A1 | 1/2004 | Pinsenschaum et al. |
| 2004/0056459 A1 | 3/2004 | Kassman et al. |
| 2004/0090054 A1 | 5/2004 | Bossecker et al. |
| 2004/0130135 A1 | 7/2004 | Ekdahl |
| 2004/0188990 A1 | 9/2004 | Short et al. |
| 2004/0256842 A1 | 12/2004 | Breed et al. |
| 2005/0052008 A1 | 3/2005 | Rose et al. |
| 2005/0057027 A1 | 3/2005 | Fogle et al. |
| 2005/0098990 A1 | 5/2005 | Pinsenschaum et al. |
| 2005/0236822 A1 | 10/2005 | Rose et al. |
| 2005/0248137 A1 | 11/2005 | Delventhal et al. |
| 2006/0001244 A1 | 1/2006 | Taguchi et al. |
| 2006/0071461 A1 | 4/2006 | Williams et al. |
| 2006/0071462 A1 | 4/2006 | Smith et al. |
| 2006/0151979 A1 | 7/2006 | DePottey et al. |
| 2006/0192370 A1 | 8/2006 | Abe et al. |
| 2006/0197327 A1 | 9/2006 | Maripudi et al. |
| 2006/0202454 A1 | 9/2006 | Parizal et al. |
| 2006/0284404 A1 | 12/2006 | Green et al. |
| 2007/0045997 A1 | 3/2007 | Abe et al. |
| 2007/0052222 A1 | 3/2007 | Higuchi et al. |
| 2007/0108750 A1 | 5/2007 | Bauer et al. |
| 2007/0126218 A1 | 6/2007 | Schneider et al. |
| 2007/0126219 A1 | 6/2007 | Williams |
| 2007/0132222 A1 | 6/2007 | Thomas et al. |
| 2007/0145729 A1 | 6/2007 | Ishiguro et al. |
| 2007/0205590 A1 | 9/2007 | Klinkenberger et al. |
| 2007/0216146 A1 | 9/2007 | Williams |
| 2008/0007038 A1 | 1/2008 | Fischer et al. |
| 2008/0018086 A1 | 1/2008 | Ford et al. |
| 2008/0023950 A1 | 1/2008 | Kalczynski et al. |
| 2008/0023959 A1 | 1/2008 | Crawford |
| 2008/0073890 A1 | 3/2008 | Williams et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0079250 A1 | 4/2008 | Boyle et al. |
| 2008/0203713 A1 | 8/2008 | McFadden et al. |
| 2008/0303256 A1 | 12/2008 | Williams |
| 2009/0033081 A1 | 2/2009 | Flischer et al. |
| 2009/0039630 A1 | 2/2009 | Schneider et al. |
| 2009/0230663 A1 | 9/2009 | Mills et al. |
| 2009/0256338 A1 | 10/2009 | Williams |
| 2010/0019476 A1 | 1/2010 | Pausch |
| 2010/0032931 A1 | 2/2010 | Kumagai et al. |
| 2010/0102542 A1 | 4/2010 | Nakajima et al. |
| 2010/0225094 A1 | 9/2010 | Rose et al. |
| 2010/0225095 A1 | 9/2010 | Smith et al. |
| 2011/0031725 A1 | 2/2011 | Rose et al. |
| 2012/0038138 A1 | 2/2012 | Kuhne et al. |
| 2012/0280477 A1 | 11/2012 | Young et al. |
| 2013/0042441 A1 | 2/2013 | Maurer |

FOREIGN PATENT DOCUMENTS

| | | |
|---|---|---|
| DE | 10059956 | 6/2002 |
| DE | 19517315 C2 | 4/2003 |
| DE | 102004049513 A1 | 4/2006 |
| EP | 0 458 838 | 5/1996 |
| EP | 1398228 | 3/2004 |
| EP | 1824710 | 6/2009 |
| EP | 1960240 | 8/2011 |
| GB | 2328646 | 3/1999 |
| JP | 03-281460 | 12/1991 |
| JP | 05085295 | 4/1993 |
| JP | 08268213 | 10/1996 |
| JP | 2001-158315 | 6/2001 |

(56) References Cited

FOREIGN PATENT DOCUMENTS

| JP | 2003-137060 | 4/2003 |
|---|---|---|
| JP | 2004-262432 | 9/2004 |
| JP | 4871286 | 11/2011 |
| MX | 282893 | 1/2011 |
| WO | WO 2004/045919 | 6/2004 |
| WO | WO 2006/041547 | 4/2006 |
| WO | WO 2006/041552 | 4/2006 |
| WO | WO 2006/073534 | 7/2006 |
| WO | WO 2007/067371 | 6/2007 |
| WO | WO 2007/067377 | 6/2007 |
| WO | WO 2008/150578 | 12/2008 |
| WO | WO 2009/020786 | 8/2009 |
| WO | WO 2010/101673 | 9/2010 |

OTHER PUBLICATIONS

Terminal Disclaimer and Response to Office Action filed Jan. 10, 2011 in co-pending U.S. Appl. No. 12/397,251, now issued as U.S. Patent No. 7,938,445.
Notice of Allowance mailed Mar. 21, 2011 in co-pending U.S. Appl. No. 12/397,251, now issued as U.S. Patent No. 7,938,445.
Notice of Allowance mailed Mar. 28, 2012 in co-pending U.S. Appl. No. 12/536,360, now issued as U.S. Patent No. 8,226,118.
Office Action mailed Oct. 11, 2012 in co-pending U.S. Appl. No. 13/553,521, now published as U.S. Patent Application Publication No. US 2012/0280477.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/071337.
Notification of Transmittal of the International Search Report and the Written Opinion of the International Searching Authority issued Aug. 15, 2008 in International Application No. PCT/US2008/060226.
Notification of Transmittal of the International Search Report and the Written Opinion of the International Searching Authority issued Jun. 2, 2009 in International Application No. PCT/US2009/040031.
Notification of Transmittal of the International Search Report and the Written Opinion of the International Searching Authority issued Mar. 29, 2010 in International Application No. PCT/US2010/021341.
Extended European Search Report dated May 4, 2010 in corresponding European patent application No. 06838372.8, now issued as European Patent No. 1,960,240.
Supplementary European Search Report dated Nov. 7, 2007 in European patent application No. 05777506.6, now issued as European Patent No. 1,824,710.
Co-pending U.S. Appl. No. 13/526,297 titled Airbag With Active Vent, filed Jun. 18, 2012.
International Search Report and Written Opinion for PCT/US2014/012268 filed Jan. 21, 2014, mailed May 9, 2014.
Office Action issued Jun. 30, 2008 in U.S. Appl. No. 11/528,266, now U.S. Patent No. 7,722,080.
Amendment and Response to Office Action in U.S. Appl. No. 11/528,266, now U.S. Patent No. 7,722,080.
Interview Summary issued Dec. 16, 2008 in U.S. Appl. No. 11/528,266, now U.S. Patent No. 7,722,080.
Notice of Allowance and Fee(s) Due issued Jan. 14, 2009 in U.S. Appl. No. 11/528,266, now U.S. Patent No. 7,722,080.
Summary of Interview filed Jan. 16, 2009 in U.S. Appl. No. 11/528,266, now U.S. Patent No. 7,722,080.
Request for Continued Examination filed Mar. 6, 2009 in U.S. Appl. No. 11/528,266, now U.S. Patent No. 7,722,080.
Office Action issued Mar. 19, 2009 in U.S. Appl. No. 11/528,266, now U.S. Patent No. 7,722,080.
Terminal Disclaimer and Amendment and Response to Office Action filed Sep. 9, 2009 in U.S. Appl. No. 11/528,266, now U.S. Patent No. 7,722,080.
Disapproval of Terminal Disclaimer issued in U.S. Appl. No. 11/528,266, now U.S. Patent No. 7,722,080.
Terminal Disclaimer filed Oct. 19, 2009 in U.S. Appl. No. 11/528,266, now U.S. Patent No. 7,722,080.
Office Action issued Oct. 21, 2009 in U.S. Appl. No. 11/528,266, now U.S. Patent No. 7,722,080.
Approval of Terminal Disclaimer issued in U.S. Appl. No. 11/528,266, now U.S. Patent No. 7,722,080.
Notice of Allowance and Fee(s) Due issued Dec. 16, 2009 in U.S. Appl. No. 11/528,266, now U.S. Patent No. 7,722,080.
Notice of Improper Request for Continued Examination issued Jan. 28, 2010 in U.S. Appl. No. 11/528,266, now U.S. Patent No. 7,722,080.
Office Action issued Jan. 2, 2009 in U.S. Appl. No. 11/528,042, now U.S. Patent No. 7,748,738.
Amendment and Response to Office Action filed Jul. 2, 2009 in U.S. Appl. No. 11/528,042, now U.S. Patent No. 7,748,738.
Notice of Allowance and Fee(s) Due issued Nov. 5, 2009 in U.S. Appl. No. 11/528,042, now U.S. Patent No. 7,748,738.
Office Action issued Nov. 12, 2009 in U.S. Appl. No. 11/528,265, now U.S. Patent No. 7,614,653.
Supplemental Office Action issued Nov. 18, 2008 in U.S. Appl. No. 11/528,265, now U.S. Patent No. 7,614,653.
Amendment and Response to Office Action filed Mar. 16, 2009 in U.S. Appl. No. 11/528,265, now U.S. Patent No. 7,614,653.
Notice of Allowance and Fee(s) Due issued Jun. 16, 2009 in U.S. Appl. No. 11/528,265, now U.S. Patent No. 7,614,653.
Office Action issued Nov. 17, 2008 in U.S. Appl. No. 11/589,316, now U.S. Patent No. 7,597,355.
Interview Summary issued Dec. 19, 2008 in U.S. Appl. No. 11/589,316, now U.S. Patent No. 7,597,355.
Amendment and Response to Office Action filed Apr. 17, 2009 in U.S. Appl. No. 11/589,316, now U.S. Patent No. 7,597,355.
Notice of Allowance and Fee(s) Due issued Jun. 17, 2009 in U.S. Appl. No. 11/589,316, now U.S. Patent No. 7,597,355.
Office Action issued Dec. 2, 2008 in U.S. Appl. No. 11/758,419, now U.S. Patent No. 7,597,356.
Interview Summary issued Mar. 17, 2009 in U.S. Appl. No. 11/758,419, now U.S. Patent No. 7,597,356.
Amendment and Response to Office Action filed ,Apr. 21, 2009 in U.S. Appl. No. 11/758,419, now U.S. Patent No. 7,597,356.
Notice of Allowance and Fee(s) Due issued Jun. 19, 2009 in U.S. Appl. No. 11/758,419, now U.S. Patent No. 7,597,356.
Office Action issued Sep. 4, 2009 in U.S. Appl. No. 11/836,499, now U.S. Patent No. 7,770,926.
Amendment and Response to Office Action filed Mar. 1, 2010 in U.S. Appl. No. 11/836,499, now U.S. Patent No. 7,770,926.
Interview Summary issued Mar. 15, 2010 in U.S. Appl. No. 11/836,499, now U.S. Patent No. 7,770,926.
Notice of Allowance and Fee(s) due issued Apr. 16, 2010 in U.S. Appl. No. 11/836,499, now U.S. Patent No. 7,770,926.
Office Communication issued Jun. 25, 2010 in U.S. Appl. No. 11/836,499, now U.S. Patent No. 7,770,926.
Office Action issued Dec. 28, 2009 in U.S. Appl. No. 12/046,014, now U.S. Patent No. 7,784,828.
Amendment and Response to Office Action filed Mar. 29, 2010 in U.S. Appl. No. 12/046,014, now U.S. Patent No. 7,784,828.
Notice of Allowance and Fee(s) Due issued May 6, 2010 in U.S. Appl. No. 12/046,014, now U.S. Patent No. 7,784,828.
Office Action issued Apr. 2, 2010 in co-pending U.S. Appl. No. 12/102,581, now issued as U.S. Patent No. 8,191,925.

(56) References Cited

OTHER PUBLICATIONS

Interview Summary issued Jun. 16, 2010 in co-pending U.S. Appl. No. 12/102,581, now issued as U.S. Patent No. 8,191,925.
Amendment and Response to Office Action filed Jun. 29, 2010 in co-pending U.S. Appl. No. 12/102,581, now issued as U.S. Patent No. 8,191,925.
Final Office Action mailed Oct. 27, 2010 in co-pending U.S. Appl. No. 12/102,581, now issued as U.S. Patent No. 8,191,925.
RCE and Amendment and Response to Office Action filed Mar. 28, 2011 in co-pending U.S. Appl. No. 12/102,581, now issued as U.S. Patent No. 8,191,925.
Office Action mailed Jun. 22, 2011 in co-pending U.S. Appl. No. 12/102,581, now issued as U.S. Patent No. 8,191,925.
Notice of Allowance mailed Mar. 28, 2012 in co-pending U.S. Appl. No. 12/102,581, now issued as U.S. Patent No. 8,191,925.
Restriction Requirement issued Jul. 21, 2010 in co-pending U.S. Appl. No. 12/397,019, now issued as U.S. Patent No. 7,946,613.
Amendment and Response to Requirement for Election of Species filed Aug. 23, 2010 in co-pending U.S. Appl. No. 12/397,019, now issued as U.S. Patent No. 7,946,613.
Office Action mailed Sep. 17, 2010 in co-pending U.S. Appl. No. 12/397,019, now issued as U.S. Patent No. 7,946,613.
Amendment and Response to Office Action filed Jan. 6, 2011 in co-pending U.S. Appl. No. 12/397,019, now issued as U.S. Patent No. 7,946,613.
Notice of Allowance mailed Mar. 16, 2011 in co-pending U.S. Appl. No. 12/397,019, now issued as U.S. Patent No. 7,946,613.
Office Action issued Mar. 15, 2006 in U.S. Appl. No. 10/832,843, now U.S. Patent No. 7,237,802.
Response to First Office Action filed Jun. 19, 2006 in U.S. Appl. No. 10/832,843, now U.S. Patent No. 7,237,802.
Notice of Allowance and Fee(s) Due issued Jun. 22, 2006 in U.S. Appl. No. 10/832,843, now U.S. Patent No. 7,237,802.
Request for Continued Examination filed Sep. 20, 2006 in U.S. Appl. No. 10/832,843, now U.S. Patent No. 7,237,802.
Notice of Allowance and Fee(s) Due issued Oct. 3, 2006 in U.S. Appl. No. 10/832,843, now U.S. Patent No. 7,237,802.
Office Action issued Jun. 27, 2006 in U.S. Appl. No. 10/959,387, now U.S. Patent No. 7,328,915.
Interview Summary issued Jan. 30, 2007 in U.S. Appl. No. 10/959,387, now U.S. Patent No. 7,328,915.
Amendment and Response to Office Action filed Feb. 20, 2007 in U.S. Appl. No. 10/959,387, now U.S. Patent No. 7,328,915.
Office Action issued May 2, 2007 in U.S. Appl. No. 10/959,387, now U.S. Patent No. 7,328,915.
Amendment and Response to Office Action filed Aug. 7, 2007 in U.S. Appl. No. 10/959,387, now U.S. Patent No. 7,328,915.
Notice of Allowance issued Oct. 5, 2007 in U.S. Appl. No. 10/959,387, now U.S. Patent No. 7,328,915.
Preliminary Amendment filed Mar. 10, 2005 in U.S. Appl. No. 10/959,256, now U.S. Patent No. 7,347,450.
Office Action issued Nov. 15, 2006 in U.S. Appl. No. 10/959,256, now U.S. Patent No. 7,347,450.
Interview Summary issued Jan. 23, 2007 in U.S. Appl. No. 10/959,256, now U.S. Patent No. 7,347,450.
Amendment and Response to Office Action filed Feb. 15, 2007 in U.S. Appl. No. 10/959,256, now U.S. Patent No. 7,347,450.
Office Action issued May 21, 2007 in U.S. Appl. No. 10/959,256, now U.S. Patent No. 7,347,450.
Amendment and Response to Office Action filed Aug. 17, 2007 in U.S. Appl. No. 10/959,256, now U.S. Patent No. 7,347,450.
Notice of Allowance and Fee(s) Due issued Nov. 27, 2007 in U.S. Appl. No. 10/959,256, now U.S. Patent No. 7,347,450.
Restriction Requirement issued Apr. 7, 2008 in U.S. Appl. No. 11/295,953, now U.S. Patent No. 7,568,729.
Response to Restriction Requirement filed Apr. 24, 2008 in U.S. Appl. No. 11/295,953, now U.S. Patent No. 7,568,729.
Office Action issued Jul. 1, 2008 in U.S. Appl. No. 11/295,953, now U.S. Patent No. 7,568,729.
Terminal Disclaimer and Amendment and Response to Office Action filed Dec. 1, 2008 in U.S. Appl. No. 11/295,953, now U.S. Patent No. 7,568,729.
Approval of Terminal Disclaimed issued in U.S. Appl. No. 11/295,953, now U.S. Patent No. 7,568,729.
Notice of Allowance and Fee(s) Due issued Apr. 2, 2009 in U.S. Appl. No. 11/295,953, now U.S. Patent No. 7,568,729.
Office Action issued Jun. 4, 2007 in U.S. Appl. No. 11/296,031, now U.S. Patent No. 7,614,654.
Amendment and Response to Office Action filed Dec. 4, 2007 in U.S. Appl. No. 11/296,031, now U.S. Patent No. 7,614,654.
Office Action issued Apr. 21, 2008 in U.S. Appl. No. 11/296,031, now U.S. Patent No. 7,614,654.
Amendment and Response to Office Action filed Jul. 21, 2008 in U.S. Appl. No. 11/296,031, now U.S. Patent No. 7,614,654.
Interview Summary issued Dec. 17, 2008 in U.S. Appl. No. 11/296,031, now U.S. Patent No. 7,614,654.
Office Action issued Oct. 21, 2008 in U.S. Appl. No. 11/296,031, now U.S. Patent No. 7,614,654.
Amendment and Response to Office Action filed Apr. 20, 2009 in U.S. Appl. No. 11/296,031, now U.S. Patent No. 7,614,654.
Notice of Allowance and Fee(s) Due issued Jul. 29, 2009 in U.S. Appl. No. 11/296,031, now U.S. Patent No. 7,614,654.
Supplemental Notice of Allowability issued Sep. 2, 2009 in U.S. Appl. No. 11/296,031, now U.S. Patent No. 7,614,654.
Office Action issued Jul. 11, 2008 in U.S. Appl. No. 11/528,118, now U.S. Patent No. 7,556,290.
Amendment and Response to Office Action issued Nov. 25, 2008 in U.S. Appl. No. 11/528,118, now U.S. Patent No. 7,556,290.
Interview Summary issued Dec. 15, 2008 in U.S. Appl. No. 11/528,118, now U.S. Patent No. 7,556,290.
Notice of Allowance and Fee(s) Due issued Feb. 10, 2009 in U.S. Appl. No. 11/528,118, now U.S. Patent No. 7,556,290.
Request for Continued Examination filed Mar. 6, 2009 in U.S. Appl. No. 11/528,118, now U.S. Patent No. 7,556,290.
Notice of Allowance and Fee(s) Due issued Mar. 23, 2009 in U.S. Appl. No. 11/528,118, now U.S. Patent No. 7,556,290.

\* cited by examiner

AIRBAG WITH SLIT VENT

TECHNICAL FIELD

The present disclosure relates to airbags having one or more vents.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
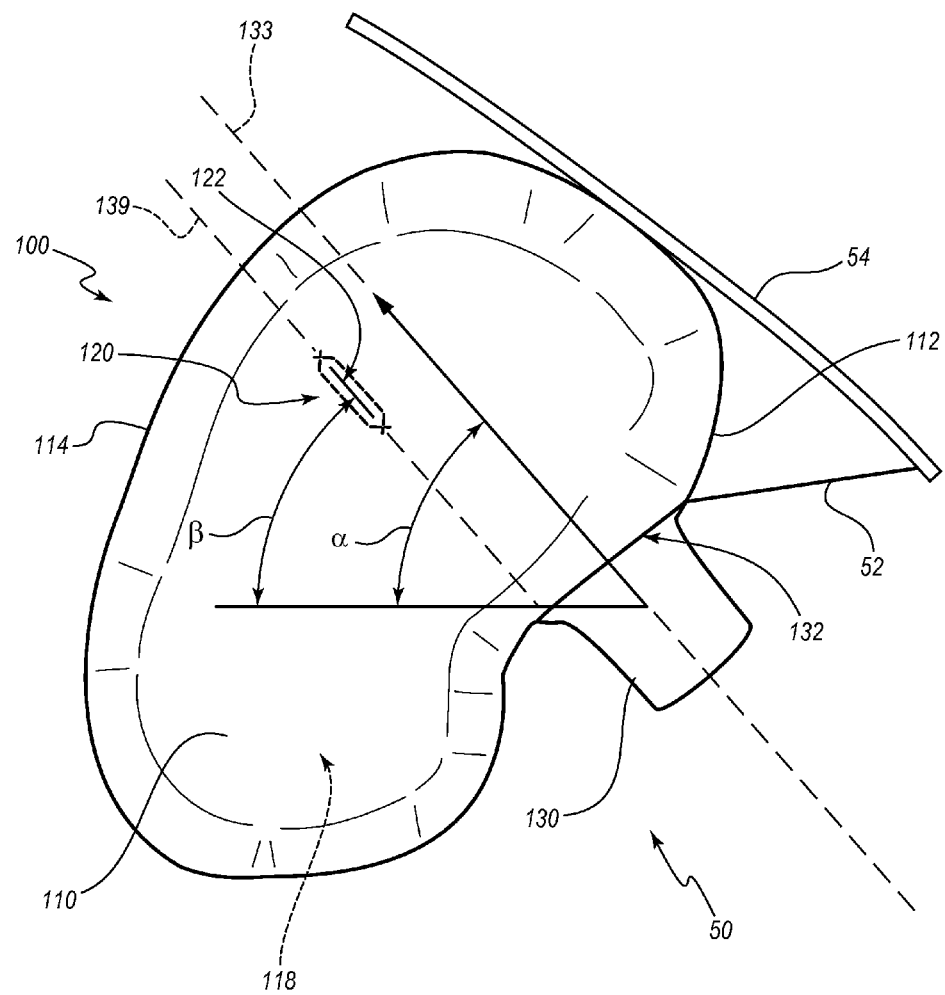
FIG. 1 is a side elevation view of an embodiment of an airbag that is installed in a vehicle and is being inflated.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other and/or coupled to each other by a fastener of any suitable variety (e.g., mounting hardware, adhesive, stitching), regardless of whether the fastener extends through additional components. The phrase "fluid communication" is used in its ordinary sense, and is broad enough to refer to arrangements in which a fluid (e.g., a gas and/or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" generally refers to an inflatable front airbag, such as a passenger airbag, although the principles discussed may apply to other airbag types in other embodiments.

Front airbags are typically installed in the steering wheel and instrument panel of a vehicle. During installation, the airbags are rolled and/or folded, and may be retained in the packaged state behind a cover. During a collision event, an inflator is triggered, which rapidly fills the airbag with inflation gas. Thus, the airbag rapidly changes from a rolled and/or folded configuration (also referred to as a packaged configuration) to an expanded or deployed configuration. For example, the expanding airbag can open the cover (e.g., tear through a burst seam or open a door-like structure) so as to exit a housing. The inflator may be triggered by any suitable device or system, and the triggering may be in response to and/or influenced by one or more vehicle sensors.

Certain embodiments of airbag assemblies that are disclosed herein are particularly well suited for passenger airbags, although other airbag configurations are contemplated. In some embodiments, the airbags can include one or more passive vents that are configured to be in a closed or substantially closed orientation during early stages of airbag deployment and are capable of opening upon full inflation and/or vehicle occupant impact for purposes of venting. In some embodiments, a passive vent may be reinforced via stitching that permits the passive vent to stay in the closed orientation during early stages of the deployment and subsequently open due to stresses acting on the airbag, such as the impact of a vehicle occupant. Various embodiments can reduce the amount of inflation gas that is used during a deployment and/or can facilitate manufacture of the airbag. One or more of the foregoing advantages and/or other advantages of various embodiments will be apparent from the disclosure that follows.

FIG. 1 depicts an airbag 100 that has been mounted within a vehicle 50. The airbag 100 is shown during an intermediate stage of deployment, such that the airbag is not yet fully inflated. The airbag 100 is shown protruding from a dashboard 52, and a forward portion thereof is in contact with a windshield 54 of the vehicle.

The airbag 100 includes a side panel 110, a front panel 112, and a rear panel 114 that cooperate to define an inflatable chamber 118. The airbag 100 may also include another side panel positioned opposite the side panel 110, which is not shown in FIG. 1. In other embodiments, more or fewer panels may be used to form the airbag 100. In the illustrated embodiment, the rear panel 114, when the airbag 100 is in the deployed and inflated configuration, is generally directed toward an occupant or an occupant position (e.g., a vehicle seat), and may at least partially define a cabin side of the airbag 100. The side panel 110 may be generally orthogonal to the rear face 114, in some embodiments. The various panels 110, 112, 114 may also be referred to as airbag cushion membranes, and may be formed of any suitable material. For example, in some embodiments, the panels 110, 112, 114 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

In the illustrated embodiment, the side panel 110 includes a passive vent 120, which may also be referred to as a slit vent 120. As described further below, the slit vent 120 can include a slit or elongated aperture 122 that can be configured to be in a closed configuration during early stages of the deployment of the airbag 100, and can further be configured to transition to an open configuration to permit venting of inflation gases from the inflatable chamber 118, depending on inflation conditions. One or more slit vents 120 can be positioned in any suitable orientation on the airbag 100. As further discussed below, the orientation of the slit vent 120 can influence its operational characteristics. In the illustrated embodiment, the airbag 100 includes two slit vents 120: one at the side panel 110 and another at the side panel (not shown) that is opposite the side panel 110. The slit vents 120 can be oriented substantially identically relative to each other in some embodiments (e.g. at the same height, depth, and rotational orientation). In other embodiments, the slit vents 120 can have different relative orientations, and each slit vent 120 may operate differently from the other.

The term "passive vent" is intended to distinguish the slit vent 120 from active systems that employ sensors or other electrical systems to sense or otherwise determine conditions relative to a vehicle occupant and/or the vehicle itself prior to, during, or after a collision event and actuate systems in response thereto. Rather, the slit vent 120 can be capable of automatically responding to passenger and/or vehicle conditions. For example, the slit vent 120 can be configured to transition to an open state in out-of-position (OOP) situations due to tensioning of various portions of the side panel 110 that result from a vehicle occupant being in close proximity to the airbag 100 as it is deployed, as discussed further below. In other or further situations, the slit vent 120 may be configured to automatically open to permit venting when the a properly positioned occupant makes contact with the airbag 100 and/or when pressure from inflation gases builds within the airbag 100 after the airbag has been fully or nearly fully inflated.

The airbag 100 can include an inflation gas inlet 132 of any suitable variety. The inflation gas inlet 132 can be coupled with an inflator for introducing inflation gases into the inflatable chamber 118. In the illustrated embodiment, the inflation gas inlet 132 comprises a mouth region of a throat 130 that extends from a main body of the airbag 100. The inflation gas inlet 132 can define a central axis 133, which in some embodiments may be a centrally positioned line that is normal to a plane defined by a perimeter of the inflation gas inlet. In some embodiments, the central axis 133 can be oriented in a direction that generally corresponds with a direction in which inflation gases are introduced into the inflatable chamber 118 and/or a direction in which the airbag 100 is initially deployed; this is shown in FIG. 1 via an arrow that is collinear with the central axis 133.

In the illustrated embodiment, the central axis 133 passes through a center of the throat 130. Additionally, in the illustrated embodiment, the deployment direction is only slightly angled toward the windshield 54. In other embodiments, the deployment direction may be steeper and more greatly angled toward the windshield 54. A portion of the airbag 100 may contact the windshield 54 at a reaction area that can aid in redirecting the general deployment direction of the airbag from that of the initial direction shown via the arrow to a more car rearward (e.g., toward the vehicle occupant) direction.

The orientation of the elongated aperture 122 of the slit vent 120 can be configured to permit the slit vent 120 to be in a closed orientation during at least initial deployment of the airbag 100 to prevent venting thereat. Stated otherwise, the slit vent 120 can be configured to substantially retain inflation gases within the inflatable chamber 118 during the initial stages of inflation. Orientation of the elongated aperture 122 relative to the initial and/or subsequent deployment directions of the airbag 100 can assist in maintaining the slit vent 120 in the closed orientation during at least the initial stages of inflation. For example, in the illustrated embodiment, the elongated aperture 122 is formed in the side panel 110, which can be substantially planar in the vicinity of the elongated aperture 122. Stated otherwise, opposing portions of the side panel 110 that define at least a portion of the elongated aperture 122 may be substantially planar when the airbag 100 is filled or partially filled with inflation gases, such as shown in FIG. 1. The plane can be substantially parallel to the central axis 133 and/or the initial inflation direction of the airbag 100. Such an arrangement can reduce or minimize inflation gas forces that act on the elongated aperture 122 during inflation. For example, such an arrangement can prevent or reduce the amount of inflation gas flow having a component that is directed toward the elongated aperture 122, e.g., so as to impinge directly on the elongated aperture 122.

In other or further embodiments, relative angular orientations of the initial inflation direction of the airbag 100 and of the elongated aperture 122 can assist in maintaining the slit vent 120 in the closed orientation during at least the initial stages of inflation. For example, it may be desirable for stresses on the side panel 110 during inflation to be primarily in a longitudinal direction along which the elongated aperture 122 extends, or stated otherwise, along a longitudinal axis 139 defined by the aperture 122. Such stresses can tend to close the elongated aperture 122. Similarly, it may be desirable to reduce or minimize stresses on the side panel 110 during inflation in a transverse direction that is perpendicular to the longitudinal axis 139 (i.e., perpendicular to the elongated aperture 122), as such stresses can tend to open the aperture 122. Accordingly, in various embodiments, an angle α defined by the initial inflation direction (or the central axis 133 of the inflation gas inlet 132) relative to the horizontal can differ from an angle β defined by the longitudinal axis 139 of the aperture 122 by no greater than about ±15, ±30, or ±45 degrees. In some embodiments, the angles α and β can be the same. In some embodiments, the angle β can be smaller than the angle α (i.e., the difference between the angle α and the angle β can be a positive value), and may account for a change in the inflation direction that may occur after the airbag contacts the reaction area of the windshield. For example the inflation direction may become more car-rearward, or shallower, than the initial inflation direction.

Figure 2A:
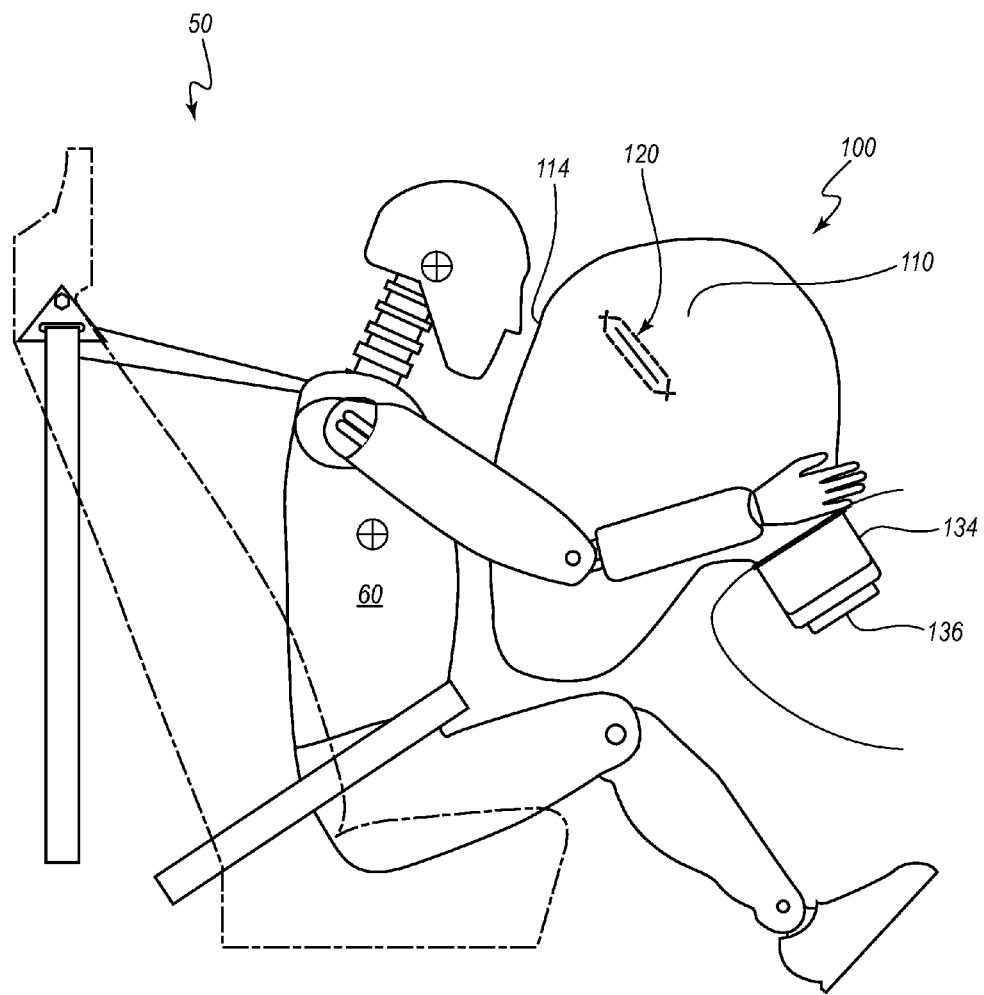
FIG. 2A is another side elevation view of the airbag of FIG. 1 at approximately the same stage of inflation shown in FIG. 1, wherein FIG. 2A further shows a vehicle occupant prior to impact with the airbag.

FIG. 2A depicts the airbag 100 installed in the vehicle 50, and further illustrates a vehicle occupant 60 positioned within the vehicle 50. Unlike FIG. 1, FIG. 2A further depicts an airbag housing 134 and an inflator 136 coupled with the airbag 100. In particular, the inflator 136 is coupled (at a minimum, is fluidly coupled) with the inflation gas inlet 132 so as to introduce inflation gas into the airbag 100. The airbag 100 is shown in an intermediate stage of deployment as it has not yet been filled to its full volume capacity by the inflation gases. As illustrated, the slit vent 120 is in the closed state such that inflation gases are inhibited (e.g., prevented or substantially prevented) from exiting the airbag 100 via the slit vent 120. As previously discussed, the slit vent 120 can be oriented on the side panel 110 in such a manner that stresses acting on the side panel 110 during initial inflation tend to keep the slit vent 120 in the closed configuration. In FIG. 2A, the head of the vehicle occupant 60 has not yet contacted the rear panel 114 of the airbag 100.

Figure 2B:
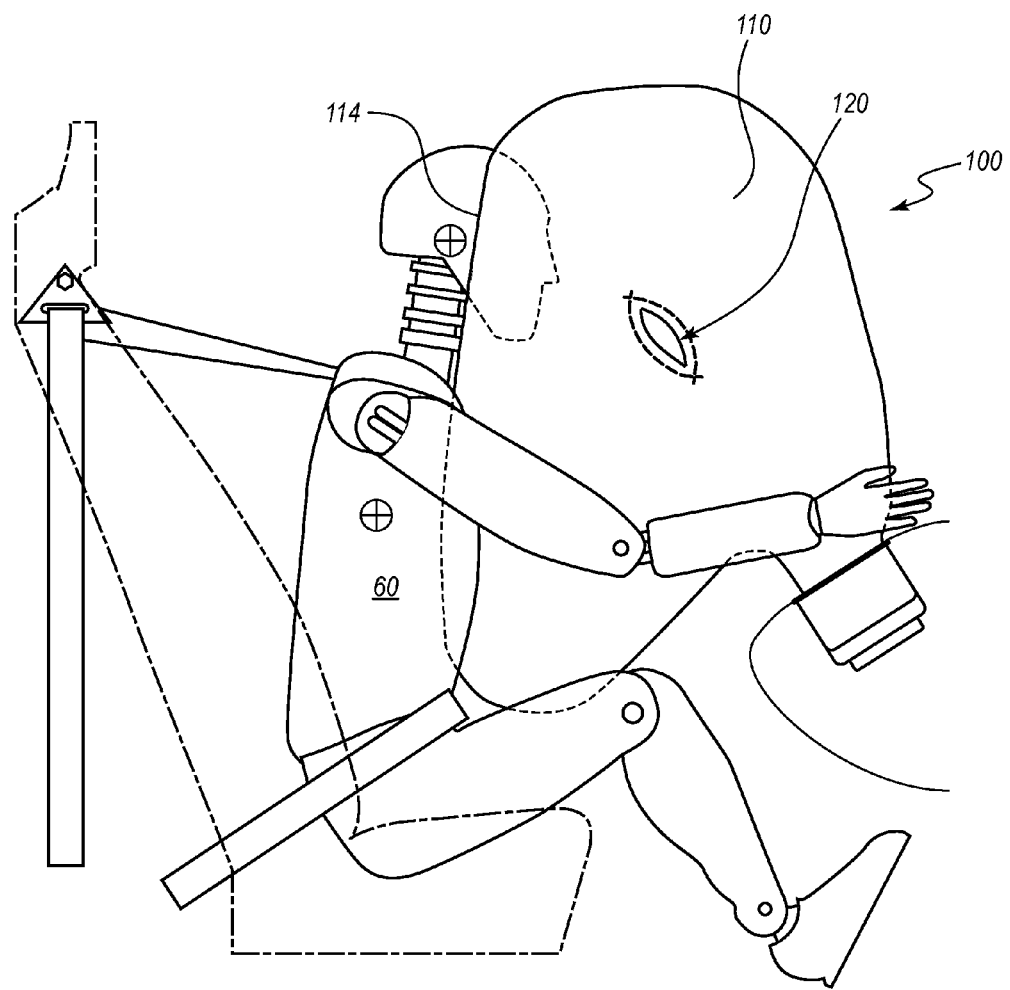
FIG. 2B is another side elevation view of the airbag of FIG. 1 after the airbag has been fully inflated and after the vehicle occupant has impacted the airbag.

FIG. 2B depicts the airbag 100 at a later stage of inflation at which the volume of the airbag 100 has increased due to further filling by inflation gas and the head of the vehicle occupant 60 has impacted the rear panel 114. The slit vent 120 is in the open or venting state in this snapshot of the deployment event. The slit vent 120 can be opened due to the increased stresses on the side panel 110 that result from increased pressure within the airbag 100 due to additional introduction of inflation gas into the airbag 100 after the airbag 100 has reached its volume capacity and/or due to the stresses that are imparted to the side panel 110 as a result of the impact between the vehicle occupant 60 and the rear panel 114 and the subsequent ride down of the vehicle occupant 60.

In the configuration illustrated in FIGS. 2A and 2B, the vehicle occupant 60 was appropriately positioned during the deployment event, and the slit vent 120 did not open until the later stages of inflation. In other configurations, stresses can act on the slit vent 120 at earlier inflation stages to open the slit vent 120 for venting. For example, in some instances, the vehicle occupant 60 may be out of position, such as initially much closer to the inflating airbag 110. The closer proximity of the vehicle occupant 60 and earlier contact of the vehicle occupant with the rear panel 114 can provide stresses to the side panel 110 that tend to open the slit vent 120 and permit venting thereat, which can accommodate or reduce the risk of injury to the OOP vehicle occupant 60 due to deployment of the airbag 100.

Figure 3:
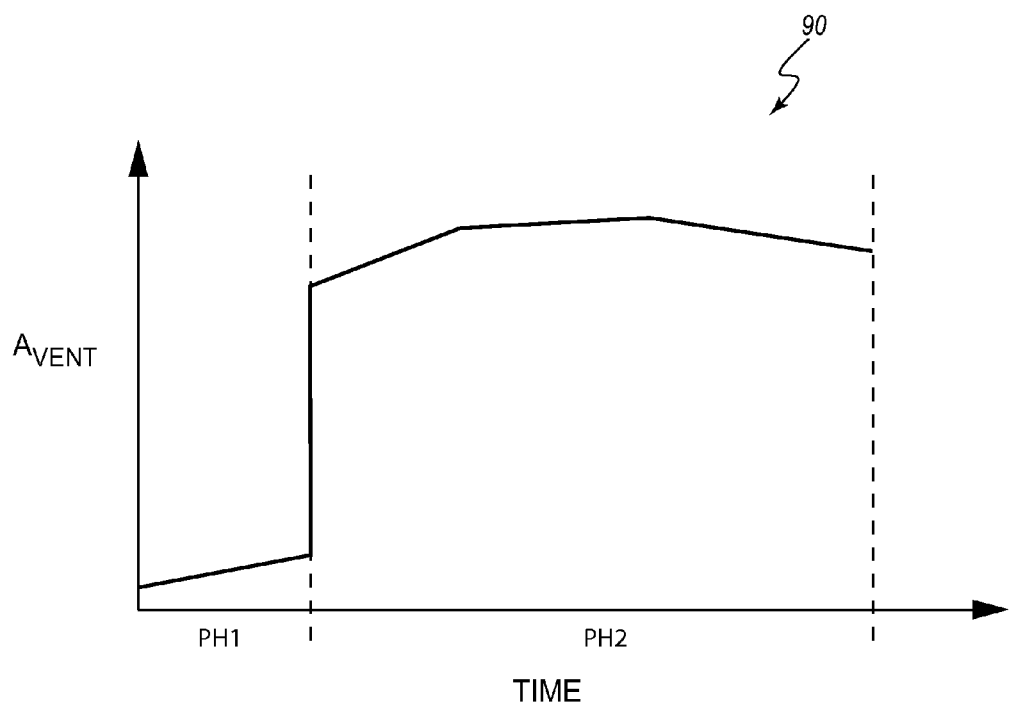
FIG. 3 is an illustrative plot depicting an area of a slit vent as a function of time during a deployment event.

FIG. 3 is an illustrative plot 90 depicting the area $A_{VENT}$ of the slit vent 120 as a function of time during different phases PH1, PH2 of airbag deployment. In the illustrated embodiment, the first phase PH1 represents the filling stage of the airbag 100 prior to the vehicle occupant 60 impacting the airbag 100. The slit vent 120 can be in the closed state during the full first phase PH1. When in the closed state, the slit vent 120 can inhibit inflation gas from exiting the airbag 100. The slit vent 120 may have some finite area that is open, such that a small amount of gas may exit the vent 120, and this small area may increase gradually as pressure from the inflation gas expands the airbag 100. However, the portions of the side panel 110 that define the aperture 122 may remain generally approximated to each other such that large amounts of inflation gas do not escape.

Upon impact by the vehicle occupant 60, which is depicted by the first vertical broken line, the area of the slit vent 120 can increase significantly to permit venting. This increase can result from the aperture 122 expanding in the transverse direction due to stresses acting on the side panel 110. The area may change somewhat over the remainder of the deployment event, such as by becoming larger during ride down of the vehicle occupant 60. In various embodiments, the average venting area in second phase PH2 can be greater than the average venting area in the first phase PH1 by no more than about 2, 4, 6, 8, 10, or 15 times or by no less than about 2, 4, 6, 8, 10, or 15 times. Other arrangements may yield plots that are different from the plot 90. For example, in some embodiments, the slit vent 120 may be closed more tightly during the initial inflation stage, such that the area at the left of the plot may be smaller.

Figure 4:
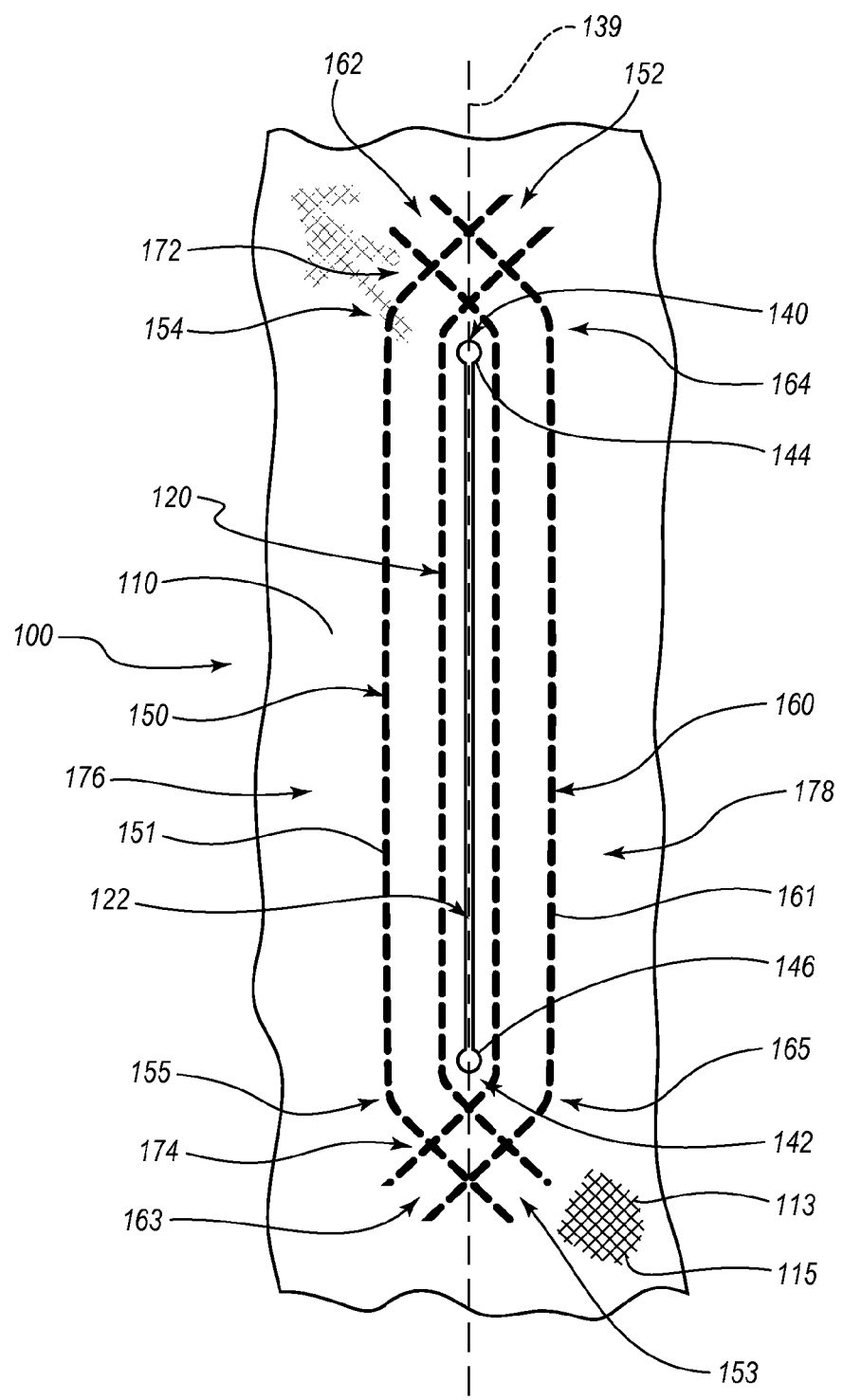
FIG. 4 is a plan view of a portion of an embodiment of a panel of the airbag of FIG. 1 showing a close-up view of an embodiment of a slit vent.

FIG. 4 provides a close-up view of the side panel 110 of the airbag 100, and shows the slit vent 120 and the elongated aperture 122 in detail. The elongated aperture 122 extends from a first end 140 to a second end 142 in a longitudinal direction, which corresponds with the longitudinal axis 139. A first portion 176 of the side panel 110 that is shown to the left of the longitudinal axis 139 cooperates with a second portion 178 of the side panel 110 that is shown to the right of the longitudinal axis 139 to define the elongated aperture 122. One or more of the first and second ends 140, 142 of the elongated aperture 122 can include a cutout region 144, 146 to prevent stress risers in the side panel 110. In the illustrated embodiment, the cutout regions 144, 146 are circular. The cutout regions 144, 146 (e.g., the circles) have a diameter that is greater than any spacing between the more intermediate or centrally located regions of the first and second portions 176, 178 of the side panel 110 that define the portion of the elongated aperture 122 that extends between the first and second cutout regions 144, 146.

The elongated aperture 122, including the cutout regions 144, 146, can be formed in any suitable manner. For example, in various embodiments, the aperture 122 can be laser cut or die cut. In some embodiments, the elongated aperture 122 is angled relative to the warp yarns 113 and weft yarns 115 of the material from which the side panel 110 is formed. In other embodiments, the aperture 122 may extend parallel to either the warp or weft yarns 113, 115.

In some embodiments, the first and second portions 176, 178 of the side panel 110 abut one another in the region between the first and second cutout regions 144, 146. For example, in some embodiments, none of the panel material is removed in forming the aperture 122, other than in the cutout regions 144, 146. In other embodiments, there may be a small spacing between the first and second portions 176, 178 of the side panel 110 in the region between the first and second cutout regions 144, 146. For example, in some embodiments, a small amount of the panel material is removed in forming the aperture 122, such as by a laser beam having a finite width or a multi-blade die cutter. Accordingly, in some embodiments, the first and second portions 176, 178 of the side panel 110 can be approximated to each other so as to abut one another when the slit vent 120 is in the closed orientation, whereas in other embodiments, the first and second portions 176, 178 of the side panel can be approximated to each other, but not touch one another, when the slit vent 120 is in the closed orientation.

The region of the slit vent 120 can be reinforced by one or more reinforcing seams 150, 160. The reinforcing seams 150, 160 can reinforce the slit vent 120, such as to prevent tearing, fraying, splitting, or other undesirable weakening of the slit vent 120, such as during an inflation event. In various embodiments, the reinforcing seams 150, 160 can cooperate to fully encompass the elongated aperture 120. Such an arrangement can aid in preventing the formation of tears and, further, can prevent any tears that may form from propagating from an interior to an exterior of the seams 150, 160. The reinforcing seams 150, 160 may be of any suitable variety, and may be formed via stitching, one or more adhesives, taping, welding (e.g., radio frequency welding), heat sealing, or any other suitable technique or combination of techniques, and thus the reinforcing seams 150, 160 may comprise one or more of stitches, welds (e.g., radiofrequency welds), and/or adhesives. In some embodiments, each seam 150, 160 may comprise a single row of stitches. In other embodiments, each seam 150, 160 may include multiple rows of stitches. Such options for forming seams apply equally to other seams discussed herein. In the illustrated embodiment, each seam 150, 160 comprises two parallel rows of stitches 151, 161, respectively.

As further discussed below, the reinforcing seams 150, 160 can be configured to permit the slit vent 120 to naturally be in the closed orientation. For example, the reinforcing seams 150, 160, may provide no bias toward the open orientation. In some embodiments, the reinforcing seams 150, 160 may provide a bias toward the closed orientation.

The reinforcing seams 150, 160 can be elongated in the longitudinal direction. As used herein, the term "longitudinal direction" includes any direction extending along the longitudinal axis 139 and/or extending parallel to the longitudinal axis 139. In the illustrated embodiment, the first portion 176 of the side panel 110 includes a portion of the reinforcing seam 150 that extends alongside the aperture 122 from the first end 140 to the second end 142 thereof. In particular, in the illustrated embodiment, the portion of the reinforcing seam 150 that extends alongside the aperture 122 is parallel to the aperture 122. Similarly, the second portion 178 of the side panel 110 includes a portion of the reinforcing seam 160 that extends alongside the aperture 122 from the first end 140 to the second end 142 thereof. In particular, in the illustrated embodiment, the portion of the reinforcing seam 160 that extends alongside the aperture 122 is parallel to the aperture 122.

Each of the reinforcing seams 150, 160 includes redirection regions 154, 164 at the first end 140 of the elongated aperture 122 and redirection regions 155, 165 at the second end 142 of the elongated aperture 122. In the illustrated embodiment, the redirection regions 154, 155, 164, 165 are substantially rounded or arc-shaped. Stated otherwise, each redirection region 154, 155, 164, 165 defines a radius of curvature. In the illustrated embodiment, the radius of curvature of each redirection region 154, 155, 164, 165 is the same as that of the remaining redirection regions. In some embodiments, the radius of curvature can be small. For example, in an arrangement such as illustrated in FIG. 4, in some embodiments, a center point of the radius of curvature for one or both of the rows of stitches 151 of the seam 150 can be on the same side of the longitudinal axis 139 as the redirection regions 154, 155. The same can also be true for the radius of curvature for one or both of the rows of stitches 161 of the seam 160.

The redirection regions 154, 155, 164, 165 can angle the reinforcing seams 150, 160 relative to the longitudinal axis 139. In various embodiments, the angle provided at one or more of the redirection regions 154, 155, 164, 165 is no greater than 15, 30, 45, or 60 degrees. In various embodiments, the curves defined by the redirection regions 154, 155, 164, 165 can introduce stresses into the panel material. In some embodiments, larger angles can introduce greater amounts of stress to the panel 110. In various embodiments, the stresses introduced by the reinforcing seam 150 can fully offset the stresses introduced by the reinforcing seam 160 in at least the transverse direction. As a result, the slit vent may naturally remain in the closed configuration in the absence of stresses to the side panel 110 other than those provided by the reinforcing seams 150, 160.

The reinforcing seam 150 can extend from a first end 152 to a second end 153. The first and second ends 152, 153 may be referred to as free ends, as they are the terminal ends of the seam 150. In the illustrated embodiment, a majority of the reinforcing seam 150 extends along the first portion 176 of the side panel 110, whereas the first and second ends 152, 153 cross over the longitudinal axis 139 and terminate at the second portion 178 of the side panel 110. Similarly, the reinforcing seam 160 can extend from a first free end 162 to a second free end 163. In the illustrated embodiment, a majority of the reinforcing seam 160 extends along the second portion 178 of the side panel 110, whereas the first and second ends 162, 163 cross over the longitudinal axis 139 and terminate at the first portion 176 of the side panel 110.

The reinforcing seams 150, 160 can cross over one another at crossing regions 172, 174, which can be spaced from and longitudinally aligned with the first and second ends 140, 142 of the elongated aperture 122, respectively. The crossing regions 172, 174 can provide enhanced reinforcement to the panel material, as they include the overlapping of the seams 150, 160. Due to the stresses that arise as the elongated aperture 122 is moved from the closed orientation to the open orientation, should any splitting of the panel material occur, it may be highly likely to do so along the longitudinal axis 139. Accordingly, the crossing regions 172, 174 can provide enhanced protection from ripping or splitting of the panel material during a deployment event.

The reinforcing seams 150, 160 can be configured to reinforce the elongated aperture 122 without causing the aperture to open. For example, the reinforcing seams 150, 160 may, in some instances, introduce stresses into the panel material, such as when the reinforcing seams 150, 160 are formed of stitches. The stresses may be greatest in the redirection regions 154, 155, 164, 165. However, the reinforcing seams may permit the slit vent 120 to naturally remain in the closed configuration in the absence of any further stresses to the panel 110, such as the further stresses due to occupant impact with the airbag 100. For example, in some arrangements, a single continuous seam may be provided about the aperture 122 in a substantially oval shape. The stresses introduced to the panel 110 by such a stitching arrangement can cause the slit vent 120 to naturally be in the open position. Stated otherwise, the stresses of such an oval-shaped stitch can undesirably bias the slit vent 120 to an open position in the absence of other stresses acting on the panel 110. Seam arrangements such as that depicted in FIGS. 1-4, in contrast, eliminate stresses that would naturally cause the slit vent 120 to be in the open position.

In the illustrated embodiment, the reinforcing seams 150, 160 are symmetrical about the longitudinal axis 139. In some instances, such symmetry can result in mirrored, countervailing, or oppositely directed stresses to cancel out each other in the transverse direction (e.g. in a direction perpendicular to the longitudinal axis 139). Furthermore, in some embodiments, the length of the redirection regions 154, 155, 164, 165 are relatively small, as compared with the length of the seams 150, 160 as a whole, such that only a small portion of the seams 150, 160 gives rise to stresses that might tend to bias the aperture 122 to the open orientation. In various embodiments, the a length of each redirection region 154, 155 is not greater than about 1/50, 1/40, 1/30, 1/20, or 1/10 of the total length of the reinforcement seam 150. In other or further embodiments, the a length of each redirection region 164, 165 is not greater than about 1/50, 1/40, 1/30, 1/20, or 1/10 of the total length of the reinforcement seam 160.

In the illustrated embodiment, the elongated aperture 122 defines a straight line. In other embodiments, the elongated aperture 122 defines a curved line, such as an arc of any suitable radius of curvature. In certain of such embodiments, portions of the reinforcements seams 150, 160 may extend alongside or adjacent to the elongated aperture 122 in a manner similar to that discussed above. The reinforcement seams 150, 160 may include regions that are parallel to the elongated aperture 122.

Figure 5A:
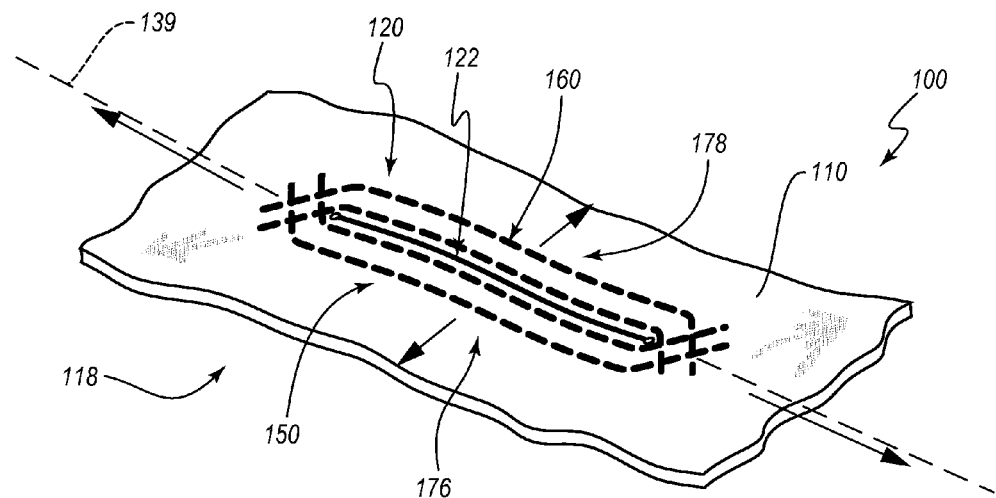
FIG. 5A is a partial cross-sectional perspective view of the slit vent of FIG. 4 in a closed orientation.
Figure 5B:
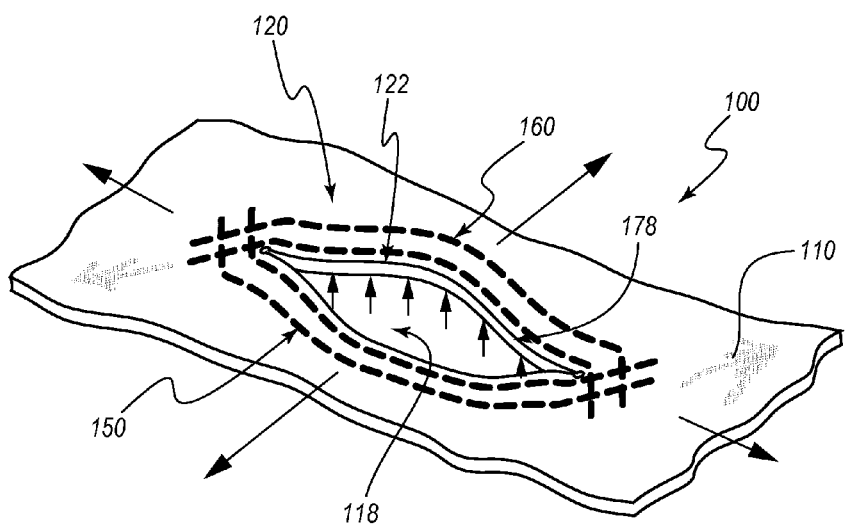
FIG. 5B is a partial cross-sectional perspective view of the slit vent of FIG. 4 in an open or venting orientation.

FIGS. 5A and 5B illustrate various stresses that can act on the side panel 110 during a deployment event, other than those that may be present due to the seams 150, 160. FIG. 5A depicts an early stage of inflation at which the slit vent 120 is closed, and can correspond with the arrangement shown in FIG. 2A. As indicated by four arrows, the stresses in the side panel 110 due to inflation gas can be primarily directed in the opposite directions along the longitudinal axis 139. The longitudinal forces can tend to keep the slit vent 120 in the closed orientation. Depending on the position of the slit vent 120, such as discussed above, these longitudinal forces can exceed forces or stressed in the transverse direction that would tend to open the slit vent 120.

FIG. 5B depicts a later stage of inflation, and can correspond with the arrangement shown in FIG. 2B. The stresses in the transverse direction can be greater than those in the longitudinal direction, and may open the slit vent 120 for venting of the airbag 100.

In various embodiments, airbags 100 having one or more of the features discussed above can reduce the size and weight of airbag modules and/or can reduce the cost of the airbag modules. For example, the airbag 100 can be more efficient, in that it can reduce the amount of inflation gas that is used during inflation, as compared with airbags that have vents that are open during the initial stages of airbag deployment (e.g., circular vents). This can result from a reduction or elimination of leakage of inflation gases from the airbag during at least the initial stages of inflation (e.g., prior to occupant loading of the airbag 100). Reducing the amount of inflation gases that are used in an inflation event can reduce system waste, system weight, energy use, and/or the envelope size of the airbag assembly. In various embodiments, the slit vent 120 does not open until the vehicle occupant 60 loads the airbag 100, thus all or substantially all of the inflation gas produced by the inflator is retained within the airbag 100 until load dampening is desired. The slit vent 120 can then open to cushion the vehicle occupant 60 upon initial impact and subsequent ride down. The slit vent 120 thus can be capable of altering its configuration in desirable manner, and can do so passively, or without complex mechanisms or devices.

Figure 6A:
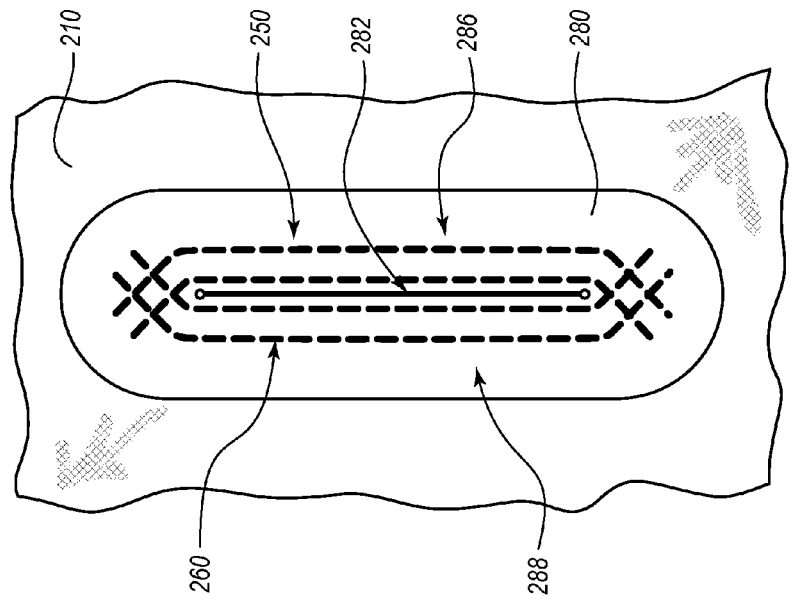
FIG. 6A is an exterior plan view of a portion of another embodiment of a panel of another embodiment of an airbag showing a close-up view of another embodiment of a slit vent that includes a reinforcing patch.
Figure 6B:
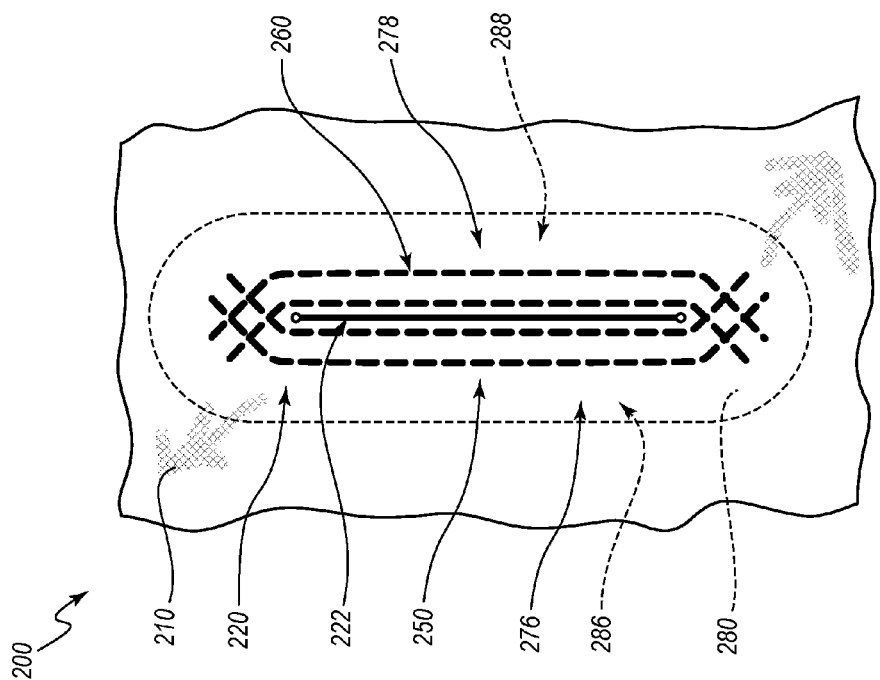
FIG. 6B is an interior plan view of the portion of the panel of the airbag of FIG. 6A.
Figure 6C:
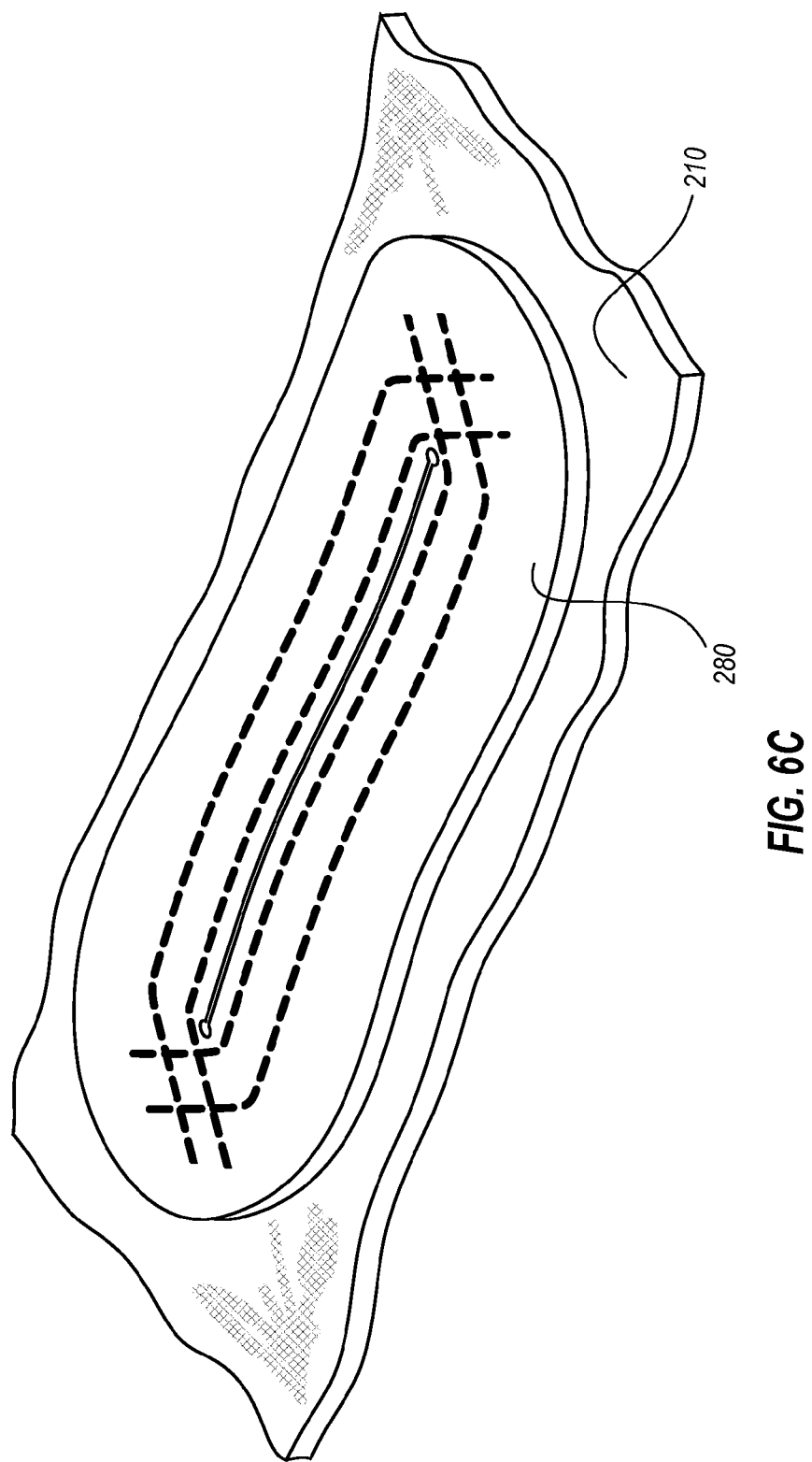
FIG. 6C is a partial cross-sectional perspective view of the slit vent of FIGS. 6A and 6B.

FIGS. 6A-6C depict a portion of another embodiment of an inflatable airbag 200 that can resemble the inflatable airbag 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag 200. Any suitable combination of the features and variations of the same described with respect to the airbag 100 can be employed with the airbag 200, and vice versa. This pattern of disclosure applies equally to further embodiments depicted in subsequent figures and described hereafter, wherein the leading digits may be further incremented.

The airbag 200 can include a side panel 210 and a slit vent 220 that includes an elongated aperture 222. The airbag 200 can further include two overlapping reinforcement seams 250, 260 that encompass the elongated aperture 222. The elongated aperture 222 can be bordered on either side by first and second portions 276, 278 of the side panel 210.

The airbag 200 can further include a reinforcing panel, doubler, or reinforcing patch 280, which can provide further reinforcement of the slit vent 220. The reinforcing patch 280 can be attached to the side panel 210 via the reinforcing stitches 250, 260, whether at the exterior or interior of the airbag 100. The reinforcing patch 280 can be formed of any suitable material, such as, for example, a piece of fabric that is the same as the fabric from which the side panel 210 is constructed. In various embodiments, the reinforcing patch 280 can include a woven nylon material. In some embodiments, the reinforcing patch 280 may be stiffer than the material of which the side panel 210 is formed. In the illustrated embodiment, the reinforcing patch 280 is approximately the same thickness as the side panel 210 material, as shown in FIG. 6C, although other arrangements are possible. Additionally, in the illustrated embodiment, the reinforcing panel 280 substantially defines an oval. Other arrangements are also possible.

The reinforcing patch 280 can define at least a portion of the slit vent 220. For example, the reinforcing patch 280 can include an elongated aperture 280 that is aligned with and/or otherwise matches the shape and/or size of the elongated aperture 222 of the side panel 210. In the illustrated embodiment, a first portion 286 of the reinforcing patch 280 includes a portion of the reinforcing seam 150 that extends alongside the aperture 282. In particular, in the illustrated embodiment, the portion of the reinforcing seam 250 that extends alongside the aperture 282 is parallel to the aperture 282. Similarly, a second portion 288 of the reinforcing patch 280 includes a portion of the reinforcing seam 260 that extends alongside the aperture 282. In particular, in the illustrated embodiment, the portion of the reinforcing seam 260 that extends alongside the aperture 282 is parallel to the aperture 282.

Figure 7B:
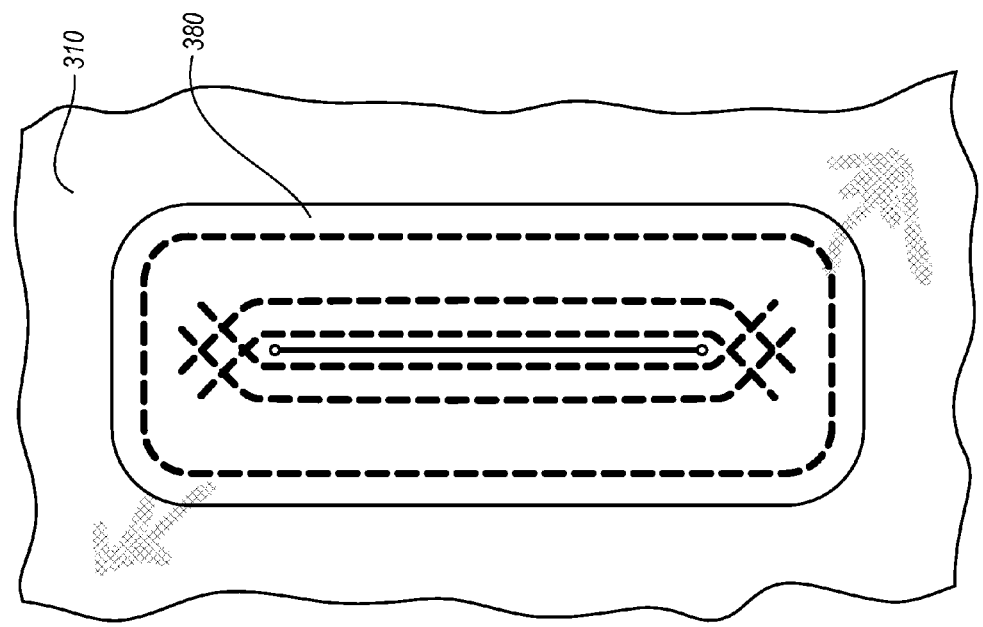
FIG. 7B is an interior plan view of the portion of the panel of the airbag of FIG. 7A.
Figure 7A:
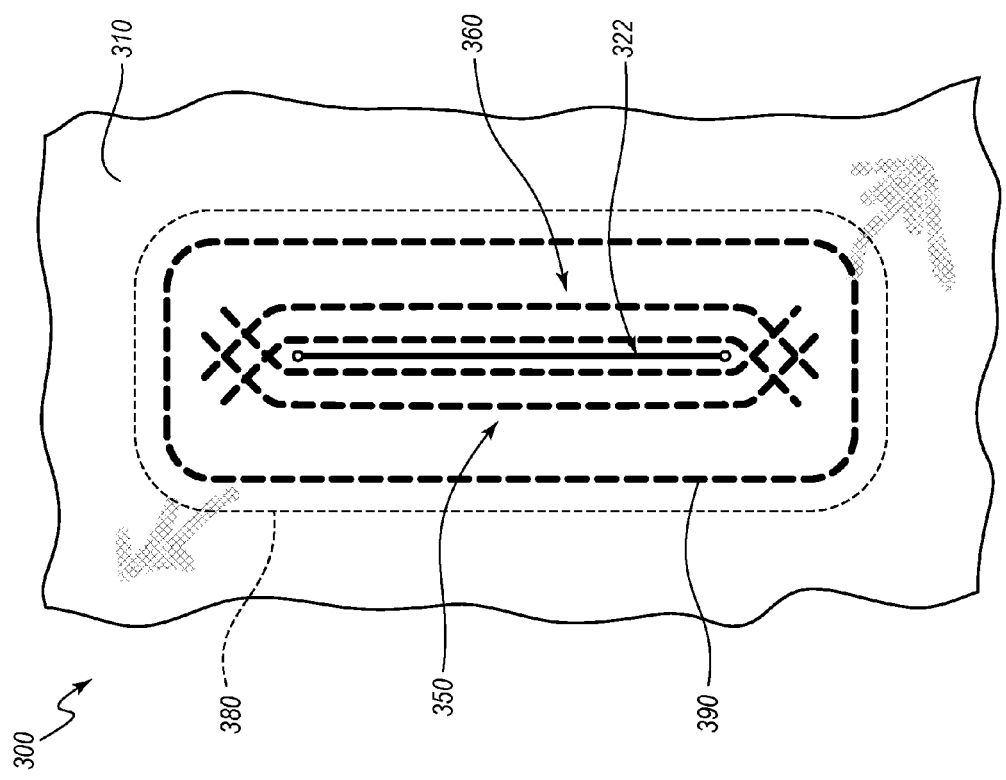
FIG. 7A is an exterior plan view of a portion of another embodiment of a panel of another embodiment of an airbag showing a close-up view of another embodiment of a slit vent that includes a reinforcing patch.

FIGS. 7A-7B illustrate a portion of another embodiment of an airbag 300 that can include a reinforcing patch 380 that is attached to a side panel 310 via reinforcing stitches 350, 360. The reinforcing patch 380 can be larger than the reinforcing patch 280 discussed above such that its edges are spaced from an aperture 322 by a greater amount. An additional seam 390 can be used to further secure the reinforcing patch 380 to the side panel 310. In some embodiments, the seam 390 is sufficiently far from the aperture 320 and/or is otherwise arranged such that stresses provided thereby to the side panel 310 do not tend to bias the aperture 322 to the open orientation.

Figure 8:
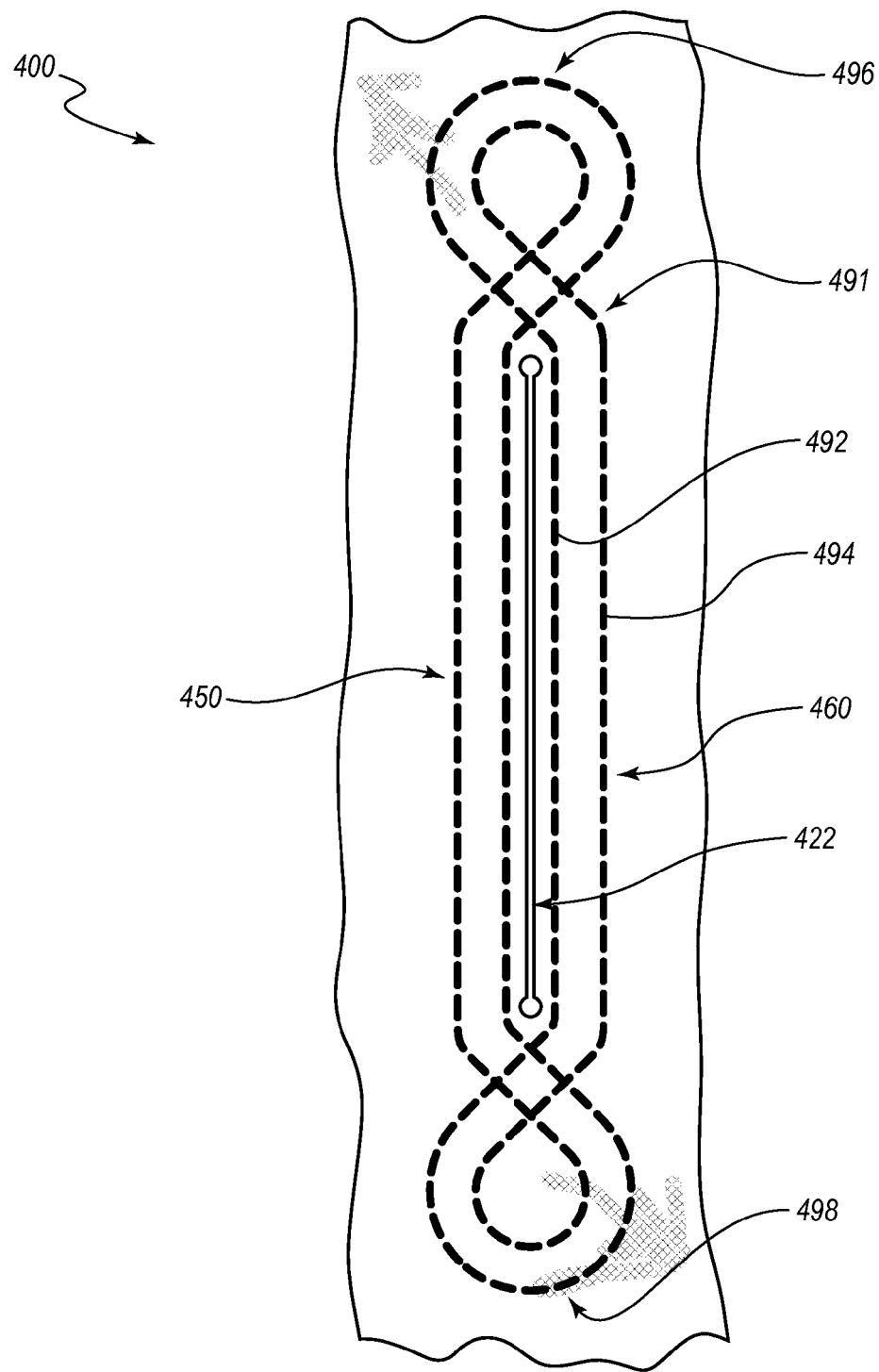
FIG. 8 is a plan view of a portion of another embodiment of a panel of another embodiment of an airbag showing a close-up view of another embodiment of a slit vent.

FIG. 8 illustrates another embodiment of an airbag 400 that includes a continuous reinforcing seam 491 that encompasses an elongated aperture 422. The reinforcing seam 491 can include portions 450, 460 that are analogous to the reinforcing seams 150, 160 discussed above. The portions 450, 460 are joined to each other at redirection regions 496, 498 at either longitudinal end of the reinforcing seam 491. The large amount of rotation in the redirection regions 496, 498 can introduce relatively large stresses into the panel material. However, these stresses may not provide a bias to the opening of the aperture 422. This may result from the stresses being at positions that are longitudinally spaced from the aperture 422 and/or are symmetrical relative to a longitudinal axis of the aperture 422. In the illustrated embodiment, the reinforcing seam 491 includes two parallel rows of stitches 492, 494.

FIGS. 9A-10B illustrate another embodiment of an airbag 500 that includes a passive vent or slit vent 520 that resembles the slit vents described above in many respects. However, the slit vent 520 further includes a flap 581. The flap 581 may also be referred to as a regulating flap or as a valve member in view of the manner in which it can operate to selectively obstruct gas flow through an aperture 522. As discussed further below, the flap 581 can be configured to prevent gas from flowing through at least a portion of the aperture 522 during early and/or intermediate stage of deployment and/or use of the airbag 500 (see FIG. 9B). When the aperture 522 is opened, however, a portion of the flap 581 can extend through the aperture 522 and permit inflation gases to exit through the aperture 522 (see FIG. 10B). The flap 581 can be formed of any suitable material. In some embodiments, the flap 581 may be configured to resist or prevent passage of gases through it. For example, in some embodiments, the flap 581 can be formed of a standard airbag material, and may be formed of the same material as other portions of the airbag 500.

Figure 9A:
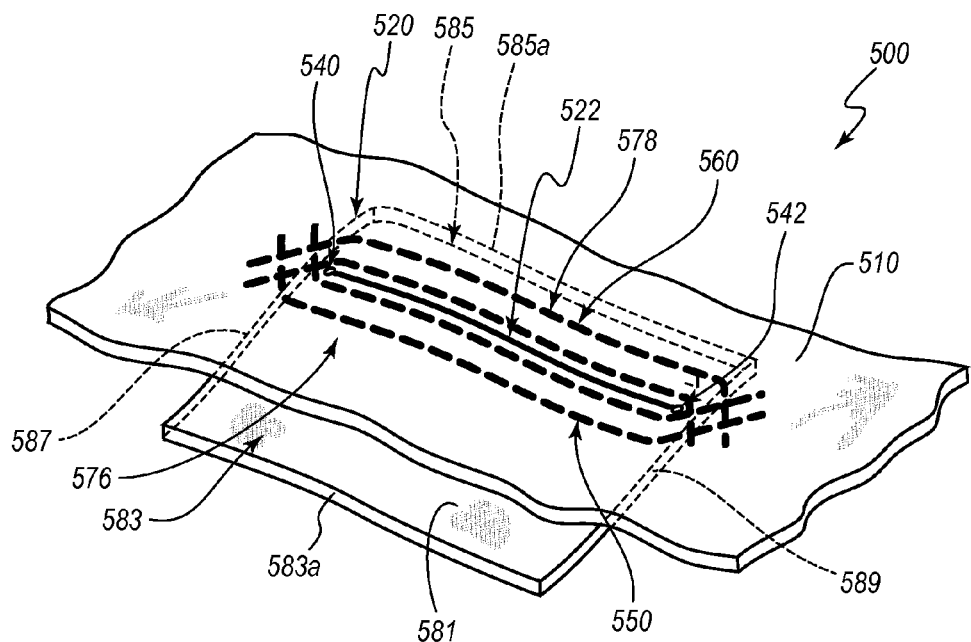
FIG. 9A is a partial cross-sectional perspective view of another embodiment of a slit vent in a closed orientation, wherein the slit vent includes an embodiment of a flap.
Figure 9B:
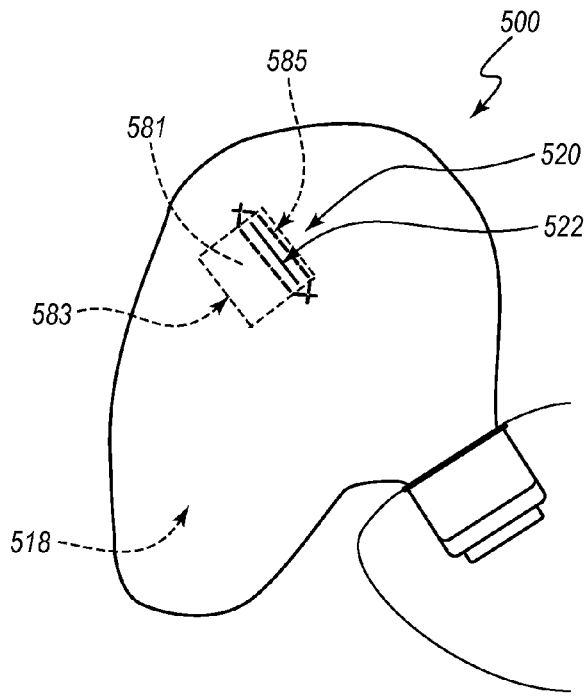
FIG. 9B is a side elevation view of an embodiment of an airbag that includes the slit vent of FIG. 9A in the closed orientation, wherein the airbag is in an intermediate stage of inflation.

With reference to FIGS. 9A and 9B, the aperture 522 can be defined by opposing first and second portions 576, 578 of a side panel 510. As with other embodiments described above, the side panel 510 can cooperate with other panels (e.g., a rear panel 514) to define an inflatable chamber 518. The aperture 522 can be bordered on either side by reinforcing seams 550, 560, which can maintain the aperture 522 in a closed configuration in the absence of other stresses on the airbag 500. The aperture 522 can be elongated between a first end 540 and a second end 542. In the illustrated embodiment, the aperture 522 defines a straight line between the first and second ends 540, 542 when the aperture 522 is closed, as shown in FIG. 9A, such that a distance between the first and second ends 540, 542 corresponds with a length of the closed aperture 522.

The flap 581 can be configured to obstruct at least a portion of the aperture 522. The flap 581 can have a width that is defined as the maximum distance in a direction collinear with or parallel to a longitudinal dimension of the aperture 522. For example, in the illustrated embodiment, the flap 581 includes two lateral edges 587, 589 that are substantially parallel to each other and that extend substantially transversely relative to a longitudinal direction of the flap 581. The width of the illustrated embodiment is defined as the distance between the lateral edges 587, 589. In the illustrated embodiment, a width of the flap 581 is greater than the length of the closed aperture 522. Accordingly, when the aperture 522 is in the closed configuration, the flap 581 covers an entirety of the aperture 522. Thus, when the slit vent 520 is in the closed orientation, the flap obstructs an entirety of the aperture 522.

In other embodiments, the flap 581 covers only a portion of the aperture 522. For example, the lateral edges 587, 589 may be closer to each other such that the width of the flap 581 is smaller than the length of the aperture 522. The flap 581 may thus obstruct only a portion of the aperture 522 when the slit vent 520 is in the closed orientation. In some arrangements, the flap 581 may more easily be forced through the aperture 522 when the flap 581 defines a width that is smaller than the length of the aperture 522. In some arrangements, the width may be selected as a balancing of various deployment factors, such as the amount of obstruction provided thereby and the ease of passage through the aperture 522. In some arrangements, a relatively wider flap 581 can provide a greater amount of obstruction, but may not deploy through the aperture 522 as easily, whereas relatively thinner flaps 581 might readily pass through the aperture 522, but may not provide a desired amount of obstruction (e.g., may permit undesired amounts of inflation gas to pass around the lateral edges 587, 589 during early stages of airbag deployment).

In some instances, a shape of the flap 581 can also affect its deployment characteristics. For example, in the illustrated embodiment, the flap 581 is substantially square. That is, the width between the lateral edges 587, 589 is substantially the same as a distance between longitudinal edges 583a, 585a of the flap 581. However, in other embodiments, the distance between the longitudinal edges 583a, 585a may be smaller. For example, the distance may be no greater than 30, 40, 50, 60, 70, 80, or 90 percent of the width of the flap 581. In some arrangements, a smaller distance between the edges 583a, 585a can allow the flap 581 to more readily pass through the aperture 522 (e.g., to slide through the aperture 522 easily and/or to pass through the aperture 522 at earlier stages of airbag deployment). In other embodiments, the lateral edges 587, 589 and/or the longitudinal edge 583a may define other shapes that can affect ease of deployment. For example, in various embodiments, the edges 587, 589, 583a may define a substantially trapezoidal or semicircular shape that decreases in size with increasing distance from the longitudinal edge 585a. Such arrangements may, in some instances, deploy through the aperture 522 more easily than square arrangements having the same maximum distance between the longitudinal edges 583a, 585a.

The flap 581 can include a fixed end or attached end 585 and a free end or transitional end 583. The fixed end 585 can be attached to the side panel 510 in any suitable manner. In the illustrated embodiment, the fixed end 585 is attached to the side panel 510 via the seam 560 (e.g., via stitching). Specifically, only the portion of the seam 560 that is at the same side of the aperture 522 as the longitudinal edge 585a of the flap 581 and that passes between the lateral edges 587, 589 of the flap 581 attaches the flap 581 to the side panel 510. The remaining portions of the seam 560 and, in the illustrated, all portions of the seam 550 are separate from or are unattached to the flap 581. Stated otherwise, the fixed end 585 of the flap 581 can be attached to the second portion 578 of the side panel 510 and the transitional end 583 of the flap can be unattached to the first portion 576 of the panel 510. The transitional end 583 of the flap 581 is free to move relative to the panel 510, and thus can be moved from the interior of the airbag 500 (e.g., from within the inflatable chamber 518) to the exterior of the airbag 500 during deployment of the airbag 500.

With reference to FIGS. 9A and 9B, operation of the flap during early stages of deployment of the airbag 500 will now be described. When the airbag 500 is in a packaged state, the flap 581 can be within the inflatable chamber 518. That is, an outwardly facing surface of the flap 581 can face an inwardly facing surface of each of the first and second portions 576, 578 of the side panel 510. Stated otherwise, the flap 581 can span at least a portion of the first and second portions 576, 578 of the side panel 510 and can obstruct at least a portion of the aperture 522. As the inflatable chamber 518 fills with inflation gas, the inflation gas can press the flap 581 against the inner surfaces of the first and second portions 576, 578 of the side panel 510. When thus pressed against the inner wall of the side panel 510, the transitional end 583 of the flap 581 may be said to be temporarily connected to the first portion 576 of the side panel 510. Accordingly, at this stage of inflation, both the transitional end 583 and the fixed end 585 of the flap 581 are attached, at least temporarily, to the side panel 510. In this orientation, the flap 581 may cover at least a portion of the aperture 522 that prevent inflation gas from passing through the aperture 522 wherever the flap 581 is present. Thus, as the airbag 500 inflates and as the slit vent 520 remains in the initial closed orientation, the flap 581 can serve to prevent gas leakage through the aperture 522 that might otherwise occur in the absence of the flap 581. The flap 581 may be said to act as a valve or as a regulating device by selectively obstructing at least a portion of the aperture 522. As previously discussed, in the illustrated embodiment, the flap 581 obstructs an entirety of the aperture 522 during the inflation stage shown in FIG. 9B, whereas in other embodiments, the flap 581 may obstruct only a portion of the aperture 522.

Figure 10A:
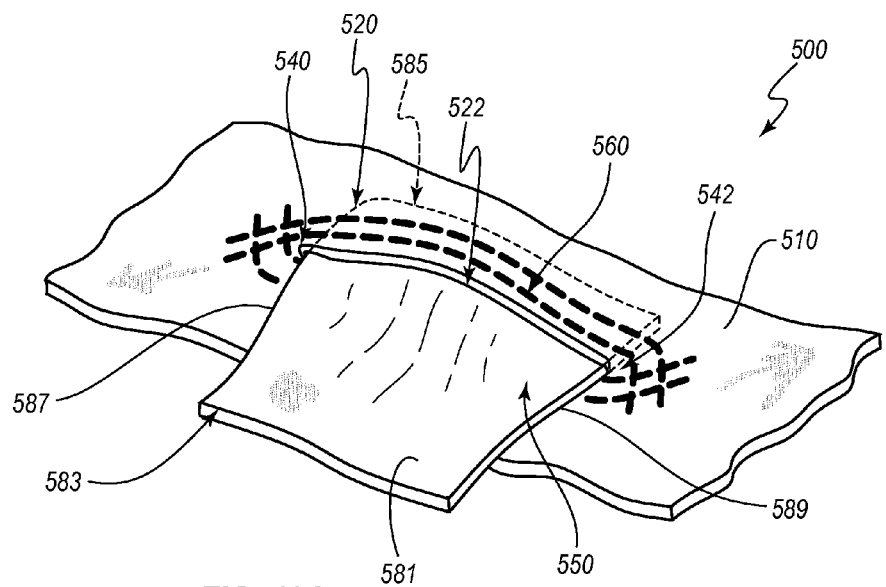
FIG. 10A is a partial cross-sectional perspective view of the slit vent of FIG. 9A in an open or venting orientation.
Figure 10B:
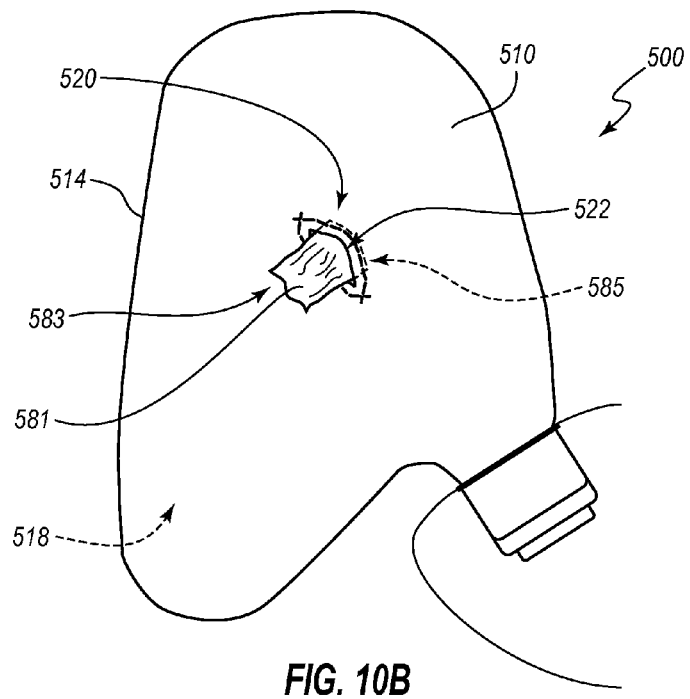
FIG. 10B is a side elevation view of the airbag that includes the slit vent of FIG. 9A, wherein the airbag is in a later stage of inflation than that shown in FIG. 9B and the slit vent is in the open or venting orientation.

With reference to FIGS. 10A and 10B, at a later stage of airbag deployment, the slit vent 520 may open due to one or more stresses acting thereon, such as those described above. For example, outwardly directed pressure from within the inflatable chamber 518 and/or other forces that tend to separate the first and second portions 576, 578 of the panel 510, such as those due to a vehicle occupant impacting the rear panel 514 of the airbag 500, can cause the first and second portions 576, 578 to separate from each other and open the aperture 522. As the aperture opens, inflation gas from within the airbag 500 can press against the flap 581 and push the transitional end 583 through the aperture 522 to an exterior of the airbag 500. The slit vent 520 thus can be said to transition to the open state in which the aperture 522 is open and the flap 581 no longer obstructs the aperture 522. Stated otherwise, the flap 581 can be moved from a first orientation in which the transitional end 583 is temporarily attached to the side panel 510 (e.g., via gas pressure) and in which the flap 581 reduces or prevents gas flow through the aperture 522 to a second orientation in which the transitional end 583 is unattached to the side panel 510 and the flap 581 permits gas flow through the aperture 522 by a greater amount than when the flap 581 is in the first orientation.

When the slit vent 520 is in the open orientation, the presence of the flap 581 may somewhat alter the opening size of the vent 520, as compared to embodiments in which the flap 581 is absent. The flap 581 may, in fact, slightly decrease the size of the opening through which inflation gases exit from the airbag 500, as compared with the aperture 522 alone. Nevertheless, this reduction of the opening size does not obstruct the egress of inflation gas via the aperture 522. Rather, the inflation gas passes by the flap 581 as it exits the airbag 500—the flap 581 does not obstruct the gas flow when in this orientation.

Figure 11:
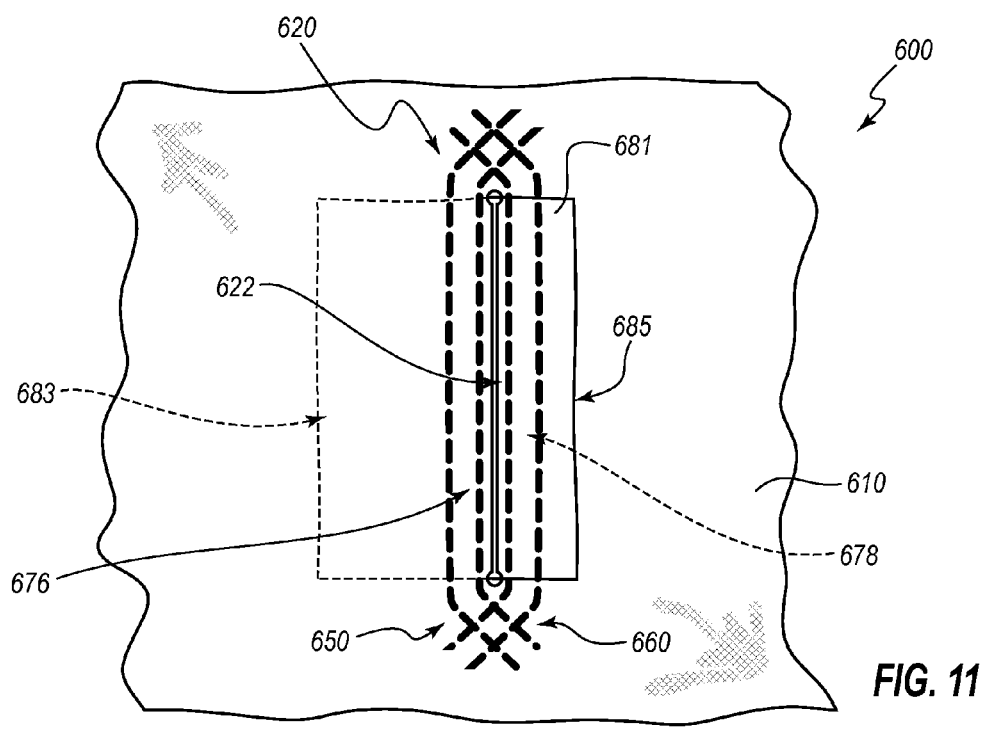
FIG. 11 is a side elevation view of a portion of another embodiment of an airbag having a slit vent that includes another embodiment of a flap, wherein the slit vent is shown in a closed orientation.

FIG. 11 illustrates another embodiment of an airbag 600 that includes a passive vent or slit vent 620 that resembles the slit vents described above in many respects, particularly the slit vent 520. However, the slit vent 620 includes a flap 681 that differs from the flap 581 in that a fixed end 685 of the flap 681 is at an exterior of a side panel 610 of the airbag 600.

The flap 681 includes a transitional end 683 that is unattached to the side panel 610. In the illustrated embodiment, a seam 650 does not attach the transitional end 683 to the side panel 610. Stated otherwise, the seam 650 does not attach any portion of the flap 681 that is positioned at an interior of the airbag 600 to the side panel 610. In the illustrated embodiment, the fixed end 685 is attached to the side panel 610 via a seam 660. The flap 681 is unattached to a first portion 676 of the side panel 610 and is attached to a second portion 678 of the side panel 610 that cooperate to define an aperture 622. When the slit vent 620 is in the closed state shown in FIG. 11, the flap 681 extends from an exterior of the airbag 600 to an interior of the airbag 600 through the aperture 622.

When the airbag 600 is in a packaged state, an outwardly facing surface of the transitional end 683 of the flap 681 (e.g., the internally positioned portion of the flap 681) faces an inwardly facing surface of the first portion 676 of the side panel 610, and an inwardly facing surface of the fixed end 685 of the flap 681 (e.g., the externally positioned portion of the flap) faces an outwardly facing surface of the second portion 678 of the side panel 610. As the airbag 600 fills with inflation gas, the inflation gas can press internal portion of the flap 681 against the inner surface of the first portion 676 of the side panel 610. The gas pressure can temporarily secure the internal portion of the flap 681 to the first portion 676 of the side panel 610. Moreover, the external portion of the flap 681 is permanently secured to the second portion 678 of the side panel 610. Accordingly, in some arrangements, the flap 681 can tend to keep the first and second portions 676, 678 in fixed relation relative to each other, which can prevent the aperture 622 from opening.

Further, the flap 681 may also be said to cover at least a portion of the aperture 622 to prevent inflation gas from passing through the aperture 622. In particular, the portion of the flap 681 that extends through the aperture 622 can block and/or redirect gases that would otherwise exit the aperture 622 unimpeded. The external portion of the flap 681 can be positioned relatively tightly against the second portion 678 of the side panel 610. Accordingly, inflation gases that might otherwise escape through the aperture 622 (e.g., between the portion of the flap 681 that extends through the aperture 622 and the portion of the aperture 622 defined by the second portion 678 of the side panel 610), can be inhibited or prevented from doing so by the interaction of the fixed end 685 the flap 681 (e.g., the external portion of the flap) and second portion 678 of the side panel 610.

Thus, as the airbag 600 inflates and as the slit vent 620 remains in the initial closed orientation, the flap 681 can serve to prevent gas leakage through the aperture 622 that might otherwise occur in the absence of the flap 681. The flap 681 may be said to act as a valve or as a regulating device by selectively obstructing at least a portion of the aperture 622. In manners such as discussed above with respect to the flap 581, in the illustrated embodiment, the flap 681 obstructs an entirety of the aperture 622 during the inflation stage of the airbag 600, whereas in other embodiments, the flap 681 may obstruct only a portion of the aperture 622.

At a later stage of airbag deployment (such as the stage depicted in FIGS. 10A and 10B) the slit vent 620 may open due to one or more stresses acting thereon, such as those described above. For example, outwardly directed pressure from within the airbag 600 and/or other forces that tend to separate the first and second portions 676, 678 of the panel 610, such as those due to a vehicle occupant impacting the rear panel 614 of the airbag 610, can cause the first and second portions 676, 678 to separate from each other and open the aperture 622. As the aperture opens, inflation gas from within the airbag 600 can press against the flap 681 and push the transitional end 683 through the aperture 622 to an exterior of the airbag 600. The slit vent 620 thus can be said to transition to the open state in which the aperture 622 is open and the flap 681 no longer obstructs the aperture 622. Stated otherwise, the flap 681 can be moved from a first orientation in which the transitional end 683 is temporarily attached to the side panel 610 (e.g., via gas pressure) and in which the flap 681 reduces or prevents gas flow through the aperture 622 to a second orientation in which the transitional end 683 is unattached to the side panel 610 and the flap 681 permits gas flow through the aperture 622 by a greater amount than when the flap 681 is in the first orientation.

Figure 12:
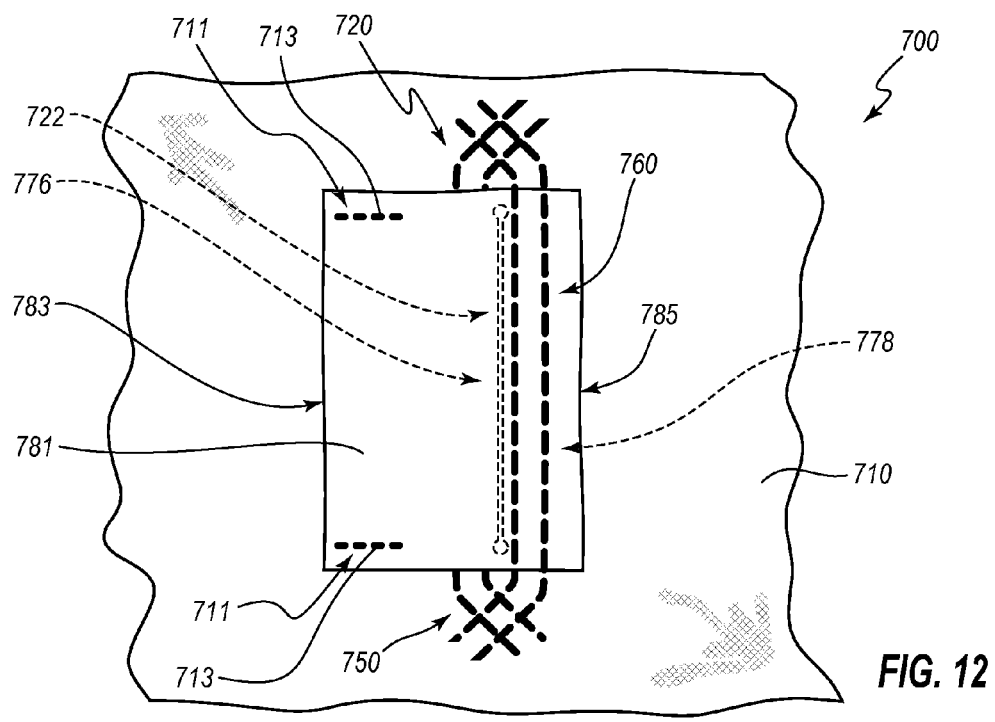
FIG. 12 is a side elevation view of a portion of another embodiment of an airbag having a slit vent that includes another embodiment of a flap, wherein the slit vent is shown in a closed orientation.

FIG. 12 illustrates another embodiment of an airbag 700 that includes a passive vent or slit vent 720 that resembles the slit vents described above in many respects, particularly the slit vents 520, 620. However, the slit vent 720 includes a flap 781 that differs from the flap 681 in that a transitional end 783 of the flap 781 is attached to an exterior of a side panel 710 of the airbag 700 via one or more temporary fasteners 711. The temporary fasteners 711 can be of any suitable variety, such as one or more adhesives and/or one or more breakaway, tear-away, or tack stitches 713. The temporary fasteners 711 can be configured to secure the transitional end 783 of the flap 781 to the side panel 710 during early stages of airbag deployment when the slit vent 720 is in a closed orientation and further configured to release the transitional end 783 of the flap 781 from the side panel 710 when the slit vent 720 is in an open orientation. In the illustrated embodiment, a seam 750 does not attach any portion of the flap 781 to the side panel 710.

In the illustrated embodiment, the fixed end 785 is attached to the side panel 710 via a seam 760. The flap 781 is unattached to a first portion 776 of the side panel 710 and is attached to a second portion 778 of the side panel 710 that cooperate to define an aperture 722. When the slit vent 720 is in the closed state shown in FIG. 12, the flap 781 is entirely at an exterior of the airbag 700.

As the airbag 700 fills with inflation gas, the inflation gas can press the first and second portions 776, 778 of the side panel 710 against the inner surface of the flap 781, which can tend to keep the first and second portions 776, 778 in fixed relation relative to each other to prevent the aperture 722 from opening. The flap 781 may be said to cover at least a portion of the aperture 722 to prevent inflation gas from passing through the aperture 722. For example, inflation gases that might otherwise escape through the aperture 722 can be inhibited or prevented from doing so by the interaction of the inner surface of the flap 781 and the external surfaces of the first and second portions 776, 778 of the side panel 710. Thus, as the airbag 700 inflates and as the slit vent 720 remains in the initial closed orientation, the flap 781 can serve to prevent gas leakage through the aperture 722 that might otherwise occur in the absence of the flap 781. The flap 781 may be said to act as a valve or as a regulating device by selectively obstructing at least a portion of the aperture 722.

At a later stage of airbag deployment (such as the stage depicted in FIGS. 10A and 10B) the slit vent 720 may open due to one or more stresses acting thereon, such as those described above. For example, outwardly directed pressure from within the airbag 700 and/or other forces that tend to separate the first and second portions 776, 778 of the panel 710, such as those due to a vehicle occupant impacting the rear panel 714 of the airbag 710, can cause the first and second portions 776, 778 to separate from each other and open the aperture 722. The stresses can further act to decouple or otherwise release the fasteners 711 and/or otherwise detach the transitional end 783 of the flap 781 from the side panel 710. In the illustrated embodiment, the tack stitches 711 may be oriented in a direction that permits them to readily release the flap 781. For example, they tack stitches 711 may extend in a direction that is parallel to a direction in which forces may act to separate the first and second portions 776, 778 of the side panel 710 from each other. This may permit pulling or tugging forces on the second portion 778, which is fixedly attached to the fixed end 785 of the flap 781, to pull the entirety of the flap 781 away from the first portion 776. In other or further embodiments, the flap 781 pressure of escaping inflation gas can decouple or otherwise release the fasteners 711. For example, as the aperture opens, inflation gas from within the airbag 700 can press against the flap 781 and push the transitional end 783 outwardly with sufficient force to detach the transitional end 783 from the side panel 710. In each case, the slit vent 720 can be said to transition to the open state in which the aperture 722 is open and the flap 781 no longer obstructs the aperture 722. Stated otherwise, the flap 781 can be moved from a first orientation in which the transitional end 783 is temporarily attached to the side panel 710 (e.g., via the one or more fasteners 711) and in which the flap 781 reduces or prevents gas flow through the aperture 722 to a second orientation in which the transitional end 783 is unattached to the side panel 710 and the flap 781 permits gas flow through the aperture 722 by a greater amount than when the flap 781 is in the first orientation.

Figure 13:
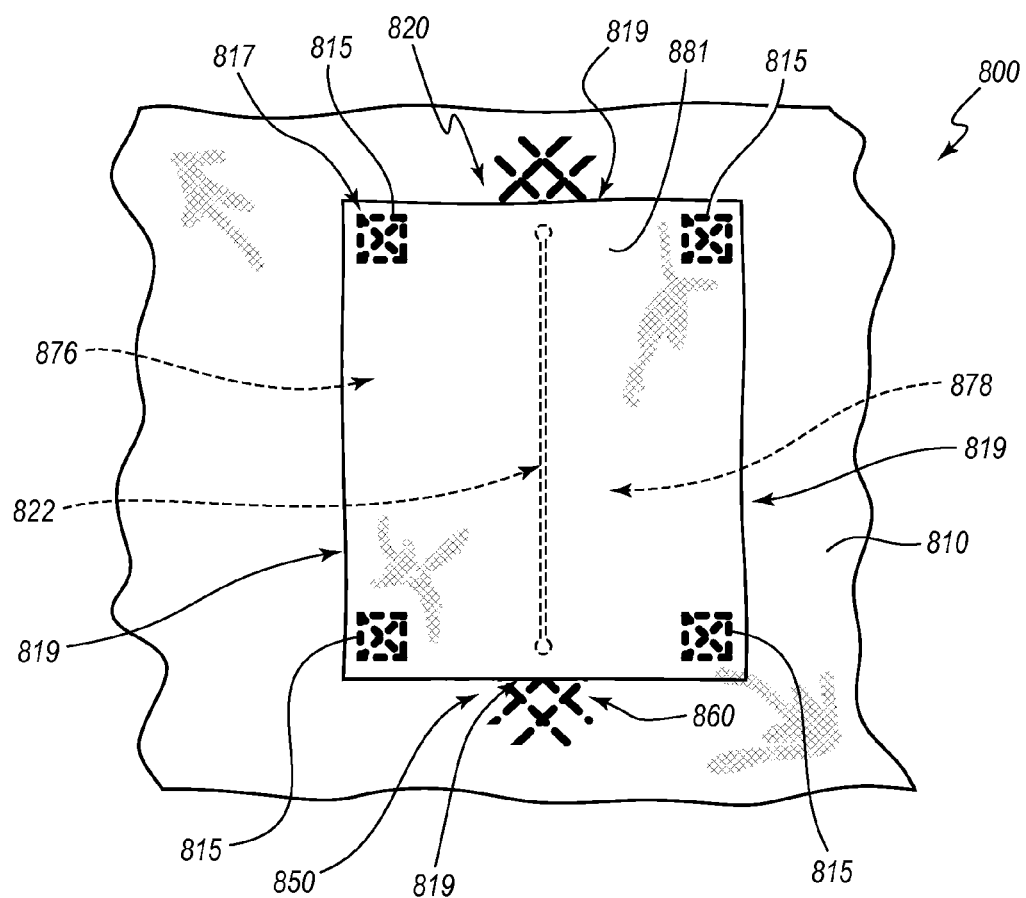
FIG. 13 is a side elevation view of a portion of another embodiment of an airbag having a slit vent that includes another embodiment of a flap, wherein the slit vent is shown in a closed orientation.

FIG. 13 illustrates another embodiment of an airbag 800 that includes a passive vent or slit vent 820 that resembles the slit vents described above in many respects. However, the slit vent 820 includes a flap 881 that is attached to an exterior of a side panel 810 of the airbag 800 via a plurality of permanent fasteners at discrete attachment regions 817. The permanent fasteners can be of any suitable variety, such as one or more adhesives, welds, and/or spot stitches 815. Adjacent fasteners can be spaced from each other to define ports 819. The flap 881 can be spaced from or separate from a pair of seams 850, 860, such that the flap 881 is not attached to the side panel 810 via the seams 850, 860.

As the airbag 800 fills with inflation gas, the inflation gas can press the first and second portions 876, 878 of the side panel 810 against the inner surface of the flap 881, which can tend to keep the first and second portions 876, 878 in fixed relation relative to each other to prevent the aperture 822 from opening. The flap 881 may be said to cover at least a portion of the aperture 822 to prevent inflation gas from passing through the aperture 822. For example, inflation gases that might otherwise escape through the aperture 822 can be inhibited or prevented from doing so by the interaction of the inner surface of the flap 881 and the external surfaces of the first and second portions 876, 878 of the side panel 810. Thus, as the airbag 800 inflates and as the slit vent 820 remains in the initial closed orientation, the flap 881 can serve to prevent gas leakage through the aperture 822 that might otherwise occur in the absence of the flap 881.

At a later stage of airbag deployment (such as the stage depicted in FIGS. 10A and 10B) the slit vent 820 may open due to one or more stresses acting thereon, such as those described above. For example, outwardly directed pressure from within the airbag 800 and/or other forces that tend to separate the first and second portions 876, 878 of the panel 810, such as those due to a vehicle occupant impacting the rear panel 814 of the airbag 810, can cause the first and second portions 876, 878 to separate from each other and open the aperture 822. Inflation gas that exits through the aperture 822 can pass through the ports 819.

Any suitable method may be employed to form airbags such as discussed above. For example, in various illustrative methods, the apertures 122, 222, 322, 422, 522 can be formed via laser cutting or die cutting. In some instances the reinforcing seams 150, 160, 250, 260, 350, 360, 491, 550, 560 can be formed manually via a sewing machine. In some instances, such a manufacturing step can avoid the use of automated or programmable sewing machines, which may reduce manufacturing costs. In other instances, automated or programmable sewing machines may be used.

References to approximations are made throughout this specification, such as by use of the terms "about," "approximately," or "substantially." For each such reference, it is to be understood that, in some embodiments, the value, feature, or characteristic may be specified without approximation. Stated otherwise, the terms of approximation include within their scope the exact feature modified by the term of approximation. For example, it is noted that in various embodiments, a portion of the side panel 110 that includes the slit vent 120 can be substantially planar. It is thus understood that in certain of such embodiments, the portion of the side panel 110 can be exactly planar.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag comprising:
   a panel defining at least a portion of an inflatable chamber that is configured to receive inflation gas from an inflator;
   a slit vent comprising an elongated aperture that extends in a longitudinal direction from a first end to a second end and is at least partially defined by opposing first and second portions of the panel, wherein the slit vent is configured to transition from a closed orientation to an open orientation, wherein the first and second portions of the panel are approximated to each other in a transverse direction that is orthogonal to the longitudinal direction to inhibit venting of the inflatable chamber when the slit vent is in the closed orientation, and wherein the opposing portions of the panel are separated from each other in the transverse direction to permit venting of the inflatable chamber when the slit vent is in the open orientation;
   a first reinforcing seam elongated in the longitudinal direction, wherein the first portion of the panel comprises a portion of the first reinforcing seam that borders the slit vent from the first end to the second end of the slit vent; and
   a second reinforcing seam elongated in the longitudinal direction, wherein the second portion of the panel comprises a portion of the second reinforcing seam that borders the slit vent from the first end to the second end of the slit vent,
   wherein the first and second reinforcing seams cross one another at a position that is spaced in the longitudinal direction from the first end of the slit vent and also cross one another at a position that is spaced in the longitudinal direction from the second end of the slit vent to encompass the slit vent, and
   wherein the first and second reinforcing seams permit the slit vent to naturally remain in the closed configuration in the absence of stresses to the panel other than any stresses provided by the first and second seams.

2. The airbag of claim 1, wherein the first and second reinforcing seams define curves that introduce stresses into the panel, and wherein the stresses introduced by the first reinforcing seam fully offset the stresses introduced by the second reinforcing seam in at least the transverse direction to permit the slit vent to naturally remain in the closed configuration in the absence of stresses to the panel other than those provided by the first and second reinforcing seams.

3. The airbag of claim 2, wherein opposing curves of the first and second reinforcing seams at one or more of the first and second ends of the slit vent define the same radius of curvature.

4. The airbag of claim 1, wherein the first reinforcing seam comprises a first line of stitching and the second reinforcing seam comprises a second line of stitching that is unconnected to the first line of stitching.

5. The airbag of claim 1, wherein a continuous line of stitching comprises each of the first and second reinforcing seams.

6. The airbag of claim 1, wherein the aperture of the slit vent substantially defines a straight line between its first and second ends when the slit vent is in the closed orientation.

7. The airbag of claim 6, wherein the portions of the first and second reinforcing seams that are comprised by the first and second portions of the panel, respectively, each substantially extends in a straight line that is parallel to the slit vent.

8. The airbag of claim 1, wherein the portions of the first and second reinforcing seams that are comprised by the first and second portions of the panel, respectively, each substantially extends in a line that is parallel to the slit vent.

9. The airbag of claim 1, wherein when the slit vent is in the closed orientation, the first and second portions of the panel abut one another.

10. The airbag of claim 1, wherein one or more of the first and second ends of the aperture of the slit vent comprises a cutout region to prevent stress risers in the panel.

11. The airbag of claim 1, further comprising a patch, wherein the first and second reinforcing seams attach the patch to the panel.

12. The airbag of claim 11, wherein the aperture of the slit vent is at least partially defined by opposing first and second portions of the patch that are approximated to each other in the lateral direction when the slit vent is in the closed orientation and that are separated from each other in the lateral direction to permit venting of the inflatable chamber when the slit vent is in the open orientation.

13. The airbag of claim 1, further comprising an inflation gas inlet that is configured to be coupled with the inflator, wherein the inflation gas inlet defines a central axis that corresponds to an initial inflation direction of the airbag when inflation gas is introduced into the inflatable chamber, and wherein the first and second portions of the panel substantially define a plane that is parallel to the central axis.

14. The airbag of claim 1, wherein the slit vent defines a longitudinal axis that extends through each of the first and second ends of the slit vent, and wherein the first and second reinforcing seams define a pattern that is symmetrical about the longitudinal axis.

15. The airbag of claim 1, wherein the slit vent defines a longitudinal axis that extends through each of the first and second ends of the slit vent, and wherein each of the first and second reinforcing seams is angled relative to the longitudinal axis by no greater than about 45 degrees at each of the first and second ends of the slit vent.

16. The airbag of claim 1, further comprising a flap permanently attached to the second portion of the panel, wherein the flap is configured to cooperate with the first and second portions of the panel to prevent inflation gas from exiting through the elongated aperture when the slit vent is in the closed orientation.

17. The airbag of claim 16, wherein a fixed end of the flap is permanently attached to the second portion of the panel and a transitional end of the flap is configured to be temporarily attached to the first portion of the panel during deployment of the airbag when the slit vent is in the closed orientation and is configured to be unattached to the first portion of the panel to permit inflation gas to exit from the aperture when the slit vent is in the open orientation.

18. The airbag of claim 16, wherein the flap is permanently attached to the first and second portions of the panel at discrete attachment regions, and wherein the flap cooperates with the panel to define a port between a set of adjacent attachment regions through which inflation gases can exit.

19. An airbag comprising:
a panel defining at least a portion of an inflatable chamber that is configured to receive inflation gas from an inflator;
a slit vent comprising an aperture that defines a straight line between a first end and a second end, wherein the aperture is bordered by opposing first and second portions of the panel and is configured to transition from a closed orientation to an open orientation, wherein the first and second portions of the panel are approximated to each other to inhibit venting of the inflatable chamber when the slit vent is in the closed orientation, and wherein the opposing portions of the panel are separated from each other to permit venting of the inflatable chamber when the slit vent is in the open orientation;
a first reinforcing seam at a first side of the slit vent that extends parallel to the slit vent from the first end to the second end of the aperture; and
a second reinforcing seam at a second side of the slit vent that extends parallel to the slit vent from the first end to the second end of the aperture,
wherein the first and second reinforcing seams extend toward each other at a position that is spaced from the first end of the slit vent, cross each other at a position that is spaced further from the first end of the slit vent, and extend away from each other at a position that is spaced even further from the first end of the slit vent,
wherein the first and second reinforcing seams extend toward each other at a position that is spaced from the second end of the slit vent, cross each other at a position that is spaced further from the second end of the slit vent, and extend away from each other at a position that is spaced even further from the second end of the slit vent, and
wherein the first and second reinforcing seams fully encompass the slit vent.

20. The airbag of claim 19, wherein the first and second reinforcing seams permit the slit vent to naturally remain in the closed configuration in the absence of stresses to the panel other than any stresses provided by the first and second seams.

21. The airbag of claim 20, wherein the first and second reinforcing seams define curves that introduce stresses into the panel, and wherein the stresses introduced by the first reinforcing seam fully offset the stresses introduced by the second reinforcing seam to permit the slit vent to naturally remain in the closed configuration in the absence of stresses to the panel other than those provided by the first and second reinforcing seams.

22. The airbag of claim 19, wherein a longitudinal axis extends through the straight line defined by the aperture of the slit vent, and wherein the first and second reinforcing seams define a pattern that is symmetrical about the longitudinal axis.

23. The airbag of claim 19, wherein the first and second reinforcing seams are independent of each other and terminate at free ends.

24. The airbag of claim 19, wherein a single continuous seam comprises each of the first and second reinforcing seams.

25. The airbag of claim 19, further comprising a patch, wherein the first and second reinforcing seams attach the patch to the panel, and wherein the aperture of the slit vent extends through both the panel and the patch and is at least partially defined by opposing first and second portions of the patch that are approximated to each other in the lateral direction when the slit vent is in the closed orientation and that are separated from each other in the lateral direction to permit venting of the inflatable chamber when the slit vent is in the open orientation.

26. The airbag of claim 19, further comprising a flap permanently attached to the second portion of the panel, wherein the flap is configured to cooperate with the first and second portions of the panel to prevent inflation gas from exiting through the elongated aperture when the slit vent is in the closed orientation.

27. A method of manufacturing an airbag, the method comprising:
forming a slit-shaped aperture in a panel that is elongated between a first end and a second end, wherein the aperture defines a longitudinal axis;
providing a first seam that borders the aperture on a first side of the longitudinal axis and that crosses over to a second side of the longitudinal axis at both a position that is spaced from the first end of the aperture and a position that is spaced from the second end of the aperture;
providing a second seam that borders the aperture on the second side of the longitudinal axis and that crosses over to the first side of the longitudinal axis and also crosses the first seam at both the position that is spaced from the first end of the aperture and the position that is spaced from the second end of the aperture; and forming an inflatable chamber that is at least partially defined by the panel.

28. The method of claim 27, wherein providing the first and second seam comprises manually stitching the first and second seams into the panel via a sewing machine.

29. The method of claim 27, further comprising permanently attaching a flap to the panel at a first side of the aperture.

30. The method of claim 29, wherein permanently attaching the flap to the panel comprises stitching the flap to the panel via the first seam but not via the second seam.

31. The method of claim 29, further comprising passing the flap through the aperture such that, when the airbag is fully assembled, a portion of the flap is permanently attached to the airbag at an exterior surface thereof and another portion of the flap is at an interior of the airbag.

32. The method of claim 27, further comprising attaching a patch to the panel via the first and second seams.

* * * * *